United States Patent
Ayukawa et al.

(10) Patent No.: US 9,983,806 B2
(45) Date of Patent: May 29, 2018

(54) STORAGE CONTROLLING APPARATUS, INFORMATION PROCESSING APPARATUS, AND COMPUTER-READABLE RECORDING MEDIUM HAVING STORED THEREIN STORAGE CONTROLLING PROGRAM

(71) Applicant: FUJITSU LIMITED, Kawasaki-shi, Kanagawa (JP)

(72) Inventors: Rikiya Ayukawa, Yokohama (JP); Kenichirou Shimogawa, Numazu (JP); Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 14/573,484

(22) Filed: Dec. 17, 2014

(65) Prior Publication Data
US 2015/0106565 A1    Apr. 16, 2015

Related U.S. Application Data

(63) Continuation of application No. PCT/JP2012/066148, filed on Jun. 25, 2012.

(51) Int. Cl.
G06F 13/00 (2006.01)
G06F 3/06 (2006.01)

(52) U.S. Cl.
CPC ............ G06F 3/0619 (2013.01); G06F 3/061 (2013.01); G06F 3/0631 (2013.01);
(Continued)

(58) Field of Classification Search
CPC ...... G06F 3/061; G06F 3/0619; G06F 3/0631; G06F 3/0659; G06F 12/1009;
(Continued)

(56) References Cited

U.S. PATENT DOCUMENTS

| | | | |
|---|---|---|---|
| 7,577,722 B1 * | 8/2009 | Khandekar | G06F 9/45558 709/220 |
| 7,899,795 B1 * | 3/2011 | Kahn | G06F 11/0727 707/690 |

(Continued)

FOREIGN PATENT DOCUMENTS

| | | |
|---|---|---|
| JP | 2-077949 A | 3/1990 |
| JP | 9-185462 A | 7/1997 |

(Continued)

OTHER PUBLICATIONS

Hewlett Packard Enterprise, "HPE 3PAR StorServ Architecture", Mar. 2016, pp. 1-41.*

(Continued)

Primary Examiner — Sean D Rossiter
(74) Attorney, Agent, or Firm — Fujitsu Patent Center

(57) ABSTRACT

A storage controlling apparatus includes a processor. The processor estimates, when a new virtual machine is to be produced, an access frequency to a new virtual disk to be allocated to the new virtual machine based on an access frequency to an existing virtual disk allocated to an existing virtual machine produced from master information on which the new virtual machine is based, and temporarily reserves, when the estimated access frequency exceeds a first threshold value, a plurality of successive allocation unit regions in a physical disk for the new virtual disk.

18 Claims, 14 Drawing Sheets

(52) U.S. Cl.
CPC .......... *G06F 3/0653* (2013.01); *G06F 3/0665* (2013.01); *G06F 3/0689* (2013.01)

(58) Field of Classification Search
CPC ............. G06F 12/1018; G06F 12/1027; G06F 12/1063; G06F 12/1072; G06F 2212/657; G06F 2212/7201
USPC ........................................................ 711/114
See application file for complete search history.

(56) References Cited

U.S. PATENT DOCUMENTS

| | | | | |
|---|---|---|---|---|
| 8,677,080 B2* | 3/2014 | Takata | ................. | G06F 3/0614 711/111 |
| 8,768,833 B2* | 7/2014 | Freishtat | ................. | G06Q 20/10 705/39 |
| 8,904,121 B2* | 12/2014 | Naito | ................. | G06F 3/061 710/120 |
| 8,918,585 B2* | 12/2014 | Naganuma | ................. | G06F 3/0607 711/114 |
| 9,086,804 B2* | 7/2015 | Isomura | ................. | G06F 3/0605 |
| 2004/0039875 A1* | 2/2004 | Kuwata | ................. | G06F 3/0605 711/114 |
| 2005/0246397 A1* | 11/2005 | Edwards | ................. | G06F 17/30067 |
| 2006/0184565 A1* | 8/2006 | Nishikawa | ................. | G06F 3/0605 |
| 2007/0277017 A1 | 11/2007 | Yamane et al. | | |
| 2008/0091748 A1* | 4/2008 | Beniyama | ................. | G06F 3/0608 |
| 2008/0140971 A1* | 6/2008 | Dankel | ................. | G06F 12/0284 711/163 |
| 2008/0184000 A1 | 7/2008 | Kawaguchi | | |
| 2009/0172272 A1 | 7/2009 | Yamane et al. | | |
| 2010/0070978 A1* | 3/2010 | Chawla | ................. | G06F 9/5077 718/105 |
| 2011/0055274 A1* | 3/2011 | Scales | ................. | G06F 17/30067 707/781 |
| 2011/0138383 A1* | 6/2011 | Le | ................. | G06F 9/5077 718/1 |
| 2011/0154331 A1* | 6/2011 | Ciano | ................. | G06F 9/45558 718/1 |
| 2011/0252214 A1* | 10/2011 | Naganuma | ................. | G06F 3/0607 711/170 |
| 2011/0264868 A1* | 10/2011 | Takata | ................. | G06F 3/0614 711/154 |
| 2012/0023292 A1 | 1/2012 | Saito et al. | | |
| 2012/0082017 A1 | 4/2012 | Inagaki | | |
| 2013/0080700 A1* | 3/2013 | Yoshida | ................. | G06F 11/3034 711/114 |
| 2013/0124854 A1* | 5/2013 | Kato | ................. | H04L 9/0816 713/155 |
| 2013/0151805 A1* | 6/2013 | Fontignie | ................. | G06F 3/0611 711/170 |
| 2014/0075190 A1* | 3/2014 | Nagai | ................. | H04L 9/3273 713/168 |
| 2014/0089921 A1* | 3/2014 | Yang | ................. | G06F 9/45558 718/1 |
| 2015/0277952 A1* | 10/2015 | Lin | ................. | G06F 9/45558 711/114 |
| 2016/0070602 A1* | 3/2016 | Shimogawa | ................. | G06F 9/45558 718/1 |
| 2016/0266923 A1* | 9/2016 | Miyoshi | ................. | G06F 9/45558 |
| 2016/0292047 A1* | 10/2016 | Bender | ................. | G06F 11/1469 |
| 2017/0031819 A1* | 2/2017 | Venkatasubramanian | ................. | G06F 9/5033 |

FOREIGN PATENT DOCUMENTS

| | | |
|---|---|---|
| JP | 2001-195270 A | 7/2001 |
| JP | 2006-059374 A | 3/2006 |
| JP | 2007-316725 A | 12/2007 |
| JP | 2008-186172 A | 8/2008 |
| JP | 2010-086420 A | 4/2010 |
| JP | 2012-079074 A | 4/2012 |
| WO | 2012/011153 A1 | 1/2012 |

OTHER PUBLICATIONS

Edison Group, "HP Thin Technologies A Competitive Comparison", Sep. 2012, pp. 1-24.*
Fujitsu, "Utilizing VMware vSphere Virtual Volumes (VVOL) with the Fujitsu Storage ETERNUS DX S3 series—Reference Architecture for Virtual Platforms", 2015, pp. 1-112 (https://www.fujitsu.com/global/Images/dx_S3_vvol_raiscsi_en.pdf).*
Adams, M., "Operate Efficiently Despite Big Data Growth Hitachi Dynamic Controller Technology", Mar. 2014, pp. 1-9 (https://www.hds.com/en-us/pdf/white-paper/hitachi-white-paper-dynamic-virtual-controller-technology.pdf).*
International Search Report, mailed in connection with PCT/JP2012/066148 and dated Oct. 2, 2012(2 pages).

* cited by examiner

FIG. 3

14a: VIRTUAL DISK MANAGEMENT TABLE

| VIRTUAL DISK IDENTIFIER | DISK CAPACITY | ACTUAL DISK USE AMOUNT | STATE | VIRTUAL STORAGE IDENTIFIER | ALLOCATION DESTINATION VM GUEST | TEMPORARY RESERVATION PERFORMANCE TARGET | TEMPORARY RESERVATION AMOUNT | TEMPORARY RESERVATION PERFORMANCE AMOUNT | I/O HISTORY (1) | I/O HISTORY (N) |
|---|---|---|---|---|---|---|---|---|---|---|
| disk 0001 | 100GB | 65GB | NORMAL | Vstorage 0001 | Guest 0001 | NO | — | — | 5 TIMES, 4 MB, 30 GB | 4 TIMES, 2 MB, 64 GB |
| disk 0002 | 300GB | 120GB | NORMAL | Vstorage 0001 | Guest 0001 | NO | — | — | 7 TIMES, 8 MB, 86 GB | 7 TIMES, 8 MB, 118 GB |
| disk 0057 | 200GB | 84GB | NORMAL | Vstorage 0002 | Guest 0002 | NO | — | — | 2 TIMES, 4 MB, 77 GB | 1 TIME, 2 MB, 84 GB |
| disk 0301 | 100GB | 65GB | NORMAL | Vstorage 0003 | Guest 0005 | YES | 0GB | 65GB | 6 TIMES, 2 MB, 17 GB | 4 TIMES, 4 MB, 64 GB |
| disk 0302 | 300GB | 45GB | NORMAL | Vstorage 0003 | Guest 0005 | YES | 55GB | 100GB | 7 TIMES, 8 MB, 21 GB | 8 TIMES, 8 MB, 44 GB |

FIG. 4

14b: VM GUEST MANAGEMENT TABLE

| VM GUEST IDENTIFIER | LOGICAL CPU | LOGICAL MEMORY | VM HOST IDENTIFIER | CLONING MASTER IMAGE IDENTIFIER | DEPLOYMENT DATE AND TIME | VIRTUAL DISK IDENTIFIER (COUPLING DEVICE NAME) |
|---|---|---|---|---|---|---|
| guest0001 | 1.0GHz × 1 | 8GB | host0001 | image0001 | 2011-01-22 11:11:00 | disk0001(scsi0:0), disk0002(scsi0:1) |
| guest0002 | 2.0GHz × 1 | 4GB | host0001 | image0002 | 2011-01-23 9:11:00 | disk0057(scsi0:0) |
| guest0003 | 1.0GHz × 2 | 16GB | host0002 | image0011 | 2011-01-23 9:11:00 | disk0014(scsi0:2), disk0123(scsi1:0), disk0082(scsi0:0) |
| guest0004 | 2.0GHz × 1 | 5GB | host0003 | image0033 | 2011-02-23 10:00:00 | disk0256(scsi0:0) |
| guest0005 | 1.0GHz × 1 | 8GB | host0002 | image0001 | 2011-02-01 11:00:00 | disk0301(ide0:0), disk0302(scsi0:0) |
| | | | | | | |

FIG. 5

14c: VIRTUAL STORAGE MANAGEMENT TABLE

| VIRTUAL STORAGE IDENTIFIER | CAPACITY | USE AMOUNT | TEMPORARY RESERVATION AMOUNT | UNUSED AMOUNT | STATE |
|---|---|---|---|---|---|
| vstorage0001 | 10TB | 3.7TB | 1.0TB | 5.3TB | NORMAL |
| vstorage0002 | 10TB | 2.8TB | 1.2TB | 6.0TB | NORMAL |
| vstorage0003 | 20TB | 11.2TB | 7.8TB | 1.0TB | NORMAL |

FIG. 6

14d: PHYSICAL DISK MANAGEMENT TABLE

| PHYSICAL DISK IDENTIFIER | BLOCK NUMBER | STATE | ALLOCATION STATE | ALLOCATION DESTINATION VIRTUAL STORAGE | ALLOCATION DESTINATION VIRTUAL DISK |
|---|---|---|---|---|---|
| 0001 | 0x0000001 | NORMAL | ALLOCATED | vstorage0003 | disk0302 |
|  | 0x0000008 | NORMAL | ALLOCATED | vstorage0003 | disk0302 |
|  | 0x0000009 | NORMAL | TEMPORARILY RESERVED | vstorage0003 | disk0302 |
|  | 0x000000F | NORMAL | TEMPORARILY RESERVED | vstorage0003 | disk0302 |
|  | 0x0000010 | NORMAL | UNALLOCATED | vstorage0003 | — |
|  | 0x131072 | NORMAL | UNALLOCATED | vstorage0003 | — |
| 0002 | 0x0000001 | NORMAL | UNALLOCATED | vstorage0001 | — |
|  | 0x131072 | NORMAL | UNALLOCATED | vstorage0001 | — |
| 0010 | 0x0000001 | NORMAL | UNALLOCATED | vstorage0002 | — |
|  | 0x131072 | NORMAL | UNALLOCATED | vstorage0002 | — |

FIG. 7

42a: ALLOCATION MANAGEMENT TABLE

| PHYSICAL DISK IDENTIFIER | BLOCK NUMBER | STATE | ALLOCATION STATE | ALLOCATION DESTINATION VIRTUAL STORAGE | ALLOCATION DESTINATION VIRTUAL DISK | VIRTUAL BLOCK NUMBER |
|---|---|---|---|---|---|---|
| 0001 | 0x0000001 | NORMAL | ALLOCATED | vstorage0003 | disk0302 | 0x00005 |
| | | | | | | |
| | 0x0000008 | NORMAL | ALLOCATED | vstorage0003 | disk0302 | 0x00012 |
| | 0x0000009 | NORMAL | TEMPORARILY RESERVED | vstorage0003 | disk0302 | — |
| | | | | | | |
| | 0x000000F | NORMAL | TEMPORARILY RESERVED | vstorage0003 | disk0302 | — |
| | 0x0000010 | NORMAL | UNALLOCATED | vstorage0003 | — | — |
| | | | | | | |
| | 0x131072 | NORMAL | UNALLOCATED | vstorage0003 | — | — |
| 0002 | 0x0000001 | NORMAL | UNALLOCATED | vstorage0001 | — | — |
| | | | | | | |
| | 0x131072 | NORMAL | UNALLOCATED | vstorage0001 | — | — |
| 0010 | 0x0000001 | NORMAL | UNALLOCATED | vstorage0002 | — | — |
| | | | | | | |
| | 0x131072 | NORMAL | UNALLOCATED | vstorage0002 | — | — |

STORAGE CONTROLLING APPARATUS, INFORMATION PROCESSING APPARATUS, AND COMPUTER-READABLE RECORDING MEDIUM HAVING STORED THEREIN STORAGE CONTROLLING PROGRAM

CROSS-REFERENCE TO RELATED APPLICATION

This application is a continuation application of International Application PCT/JP2012/066148 filed on Jun. 25, 2012 and designated the U.S., the entire contents of which are incorporated herein by reference.

FIELD

The present invention relates to a storage controlling apparatus, an information processing apparatus, and a computer-readable recording medium having stored therein a storage controlling program.

BACKGROUND

In a storage apparatus, a virtualization function for virtualizing a resource to efficiently utilize a physical disk region is occasionally used. For example, as a virtualization function, Thin Provisioning is known.

In the thin provisioning method, a region of a virtual disk is managed in a region called block of, for example, 512 KB and additional allocation to a physical disk is performed one by one block as occasion demands. In the thin provisioning method, when a virtual disk of a capacity (for example, 100 GB) requested by a user is created, all regions by 100 GB are not physically allocated at the same time with the creation, but a virtual region is dynamically allocated to a physical disk in a unit of a block in accordance with a capacity with which data is to be actually written.

It is to be noted that, as a related technology, a technology is known by which, when the thin provisioning technology is applied, a storage apparatus allocates a disk pool region to a logical disk in a different unit of allocation in response to whether the allocation policy set to the logical disk attaches importance to the speed or to the capacity. In the technology, if a writing request of data is received, then an I/O pattern is decided and the allocation policy is changed in response to the I/O pattern. Further, in the technology, re-arrangement of a data region is periodically performed in response to the allocation policy. For example, where the allocation policy is set to the attachment of importance to the speed, original data is copied into an allocated region and a data region before the copying is deleted such that non-successive data regions are determined as successive data regions.

In a virtual emulator, also a technology for retaining an operation situation of one or more kinds of virtual servers and another technology for analyzing an access pattern for successively or non-successively accessing data stored in a secondary storage apparatus to predict data to be accessed in the future and reading out the data in advance from a secondary apparatus into a main storage apparatus are known.

Patent Document 1: Japanese Laid-Open Patent Publication No. 2010-86420
Patent Document 2: Japanese Laid-Open Patent Publication No. 2001-195270
Patent Document 3: Japanese Laid-Open Patent Publication No. 09-185462
Patent Document 4: Japanese Laid-Open Patent Publication No. 2008-186172
Patent Document 5: Japanese Laid-Open Patent Publication No. 02-77949

In the thin provisioning method, while a physical disk can be utilized efficiently, regions allocated to a virtual disk exist in a dispersed relationship in the physical disk. Therefore, in the thin provisioning method, a sequential I/O (Input/Output) performance sometimes degrades in comparison with a Thick Provisioning method by which the entire capacity of a virtual disk is allocated collectively to a physical disk.

Further, in the related technology described above, since decision of an I/O pattern and allocation of a disk pool region in accordance with an allocation policy are performed in response to a writing request, it takes time before data relating to the writing request is written into the disk pool region and a performance of a writing process degrades occasionally.

SUMMARY

According to an aspect of the embodiment, a storage controlling apparatus, including a processor, wherein the processor estimates, when a new virtual machine is to be produced, an access frequency to a new virtual disk to be allocated to the new virtual machine based on an access frequency to an existing virtual disk allocated to an existing virtual machine produced from master information on which the new virtual machine is based, and temporarily reserves, when the estimated access frequency exceeds a first threshold value, a plurality of successive allocation unit regions in a physical disk for the new virtual disk.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a virtual disk management table stored in a DB depicted in FIG. 1;

FIG. 4 is a view illustrating an example of a VM guest management table stored in the DB depicted in FIG. 1;

FIG. 5 is a view illustrating an example of a virtual storage management table stored in the DB depicted in FIG. 1;

FIG. 6 is a view illustrating an example of a physical disk management table stored in the DB depicted in FIG. 1;

FIG. 7 is a view illustrating an example of an allocation management table stored in the physical storage apparatus depicted in FIG. 1;

DESCRIPTION OF EMBODIMENTS

In the following, an embodiment is described with reference to the drawings.

[1] Embodiment

[1-1] Description of the Information Processing Apparatus

Figure 1:
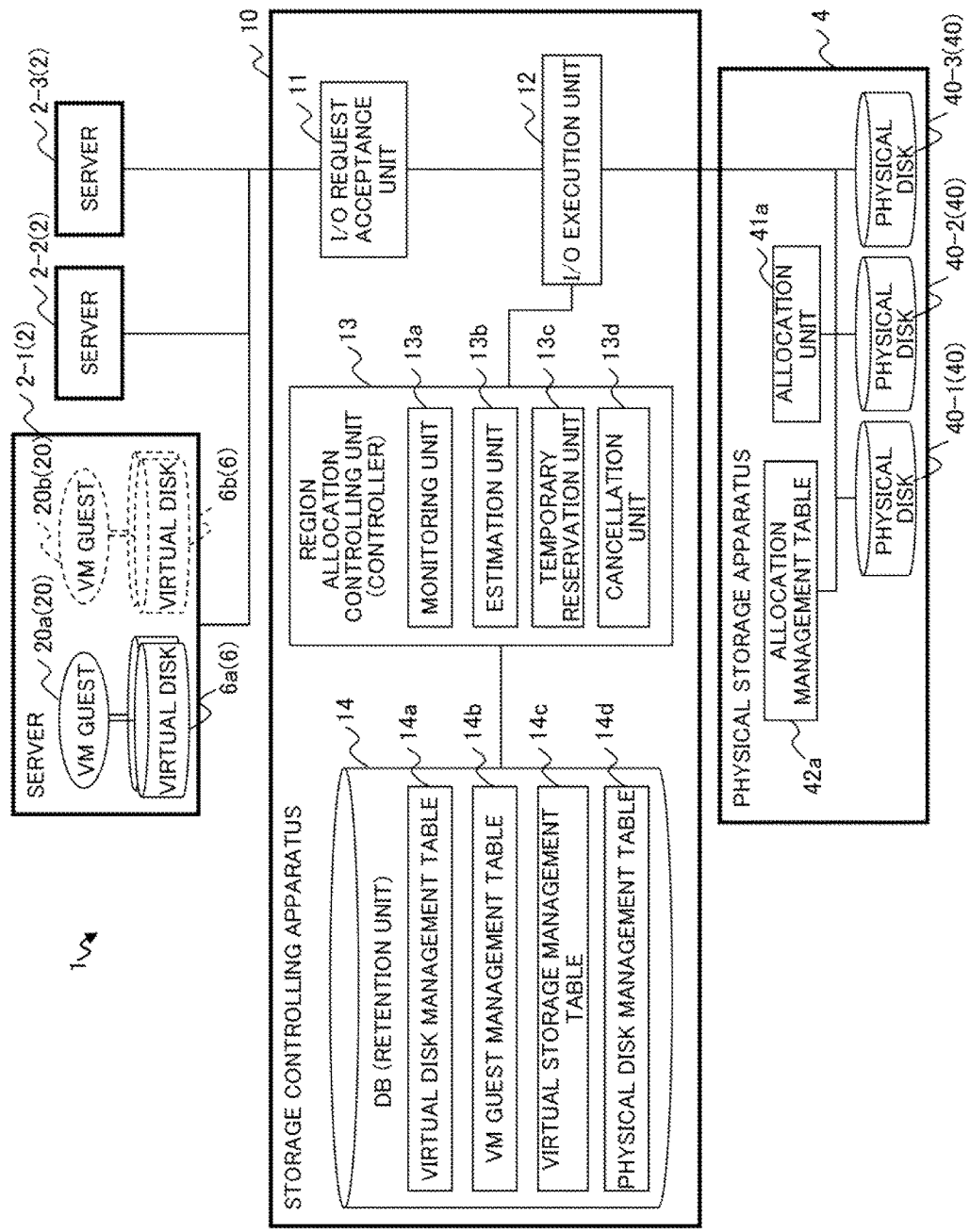
FIG. 1 is a block diagram depicting an example of a functional configuration of an information processing apparatus according to an embodiment.
Figure 2:
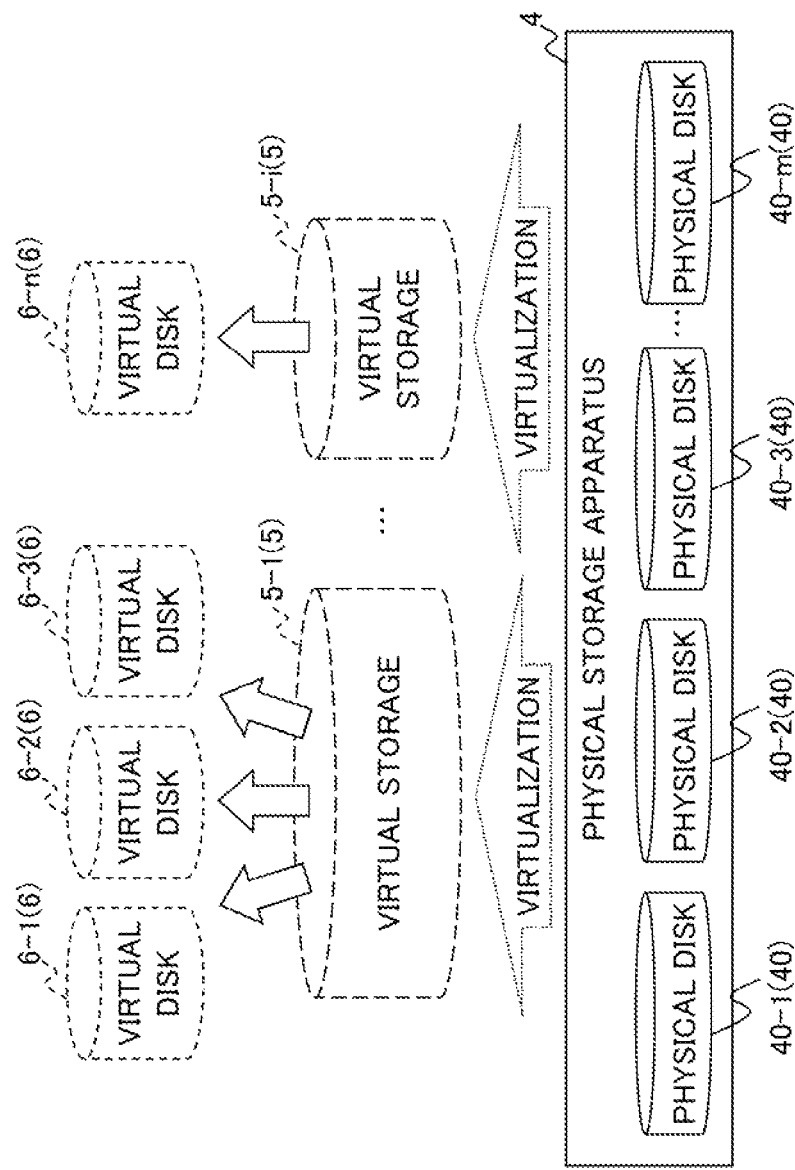
FIG. 2 is a view illustrating an example of a relationship between a physical storage apparatus depicted in FIG. 1 and virtual disks of a virtual storage.

FIG. 1 is a block diagram depicting an example of a functional configuration of an information processing apparatus 1 according to the embodiment, and FIG. 2 is a view illustrating an example of a relationship between a physical storage apparatus 4 depicted in FIG. 1 and virtual disks 6 of a virtual storage 5. As depicted in FIG. 1, the information processing apparatus 1 includes at least one server, for example, three servers 2-1 to 2-3, the physical storage apparatus 4 and a storage controlling apparatus 10.

The servers (server apparatus) 2-1 to 2-3 (where they are not distinguished from each other, each of them is hereinafter referred to simply as server 2) are electronic computers that individually execute virtualization software (not depicted) such as a hypervisor to execute at least one VM (Virtual Machine) guest on the virtualization software. The VM guest is an example of a virtual machine that operates using part of resources of the server 2. Further, a guest OS (Operating System) is executed on the VM guest. It is to be noted that the virtualization software is referred to sometimes as VM host.

For example, the server 2-1 depicted in FIG. 1 executes a VM guest 20a on the VM host not depicted. Further, a guest OS operates on the VM guest 20a (not depicted). It is to be noted that a VM guest 20b indicated by a broken line represents a VM guest to be newly produced. Further, though not depicted, also the servers 2-2 and 2-3 depicted in FIG. 1 can execute the VM host and the VM guest 20, on which the guest OS operates, similarly to the server 2-1. Where the VM guests 20a and 20b and the VM guests to be executed by the server 2-2 and 2-3 are not distinguished from each other, each of the VM guests is hereinafter referred to simply as VM guest 20.

The servers 2 and a management server 3 (refer to FIG. 7) hereinafter described can perform production (deployment) of a new VM guest 20 on the VM host of a predetermined server 2 in accordance with an instruction from a user, a manager or the like. Further, when the VM guest 20 is to be produced, the server 2 or the management server 3 can produce a guest OS based on master information such as a cloning master image. It is to be noted that the cloning master image is image data on which a guest OS is based, and a plurality of kinds of cloning master images are prepared in advance in a storage apparatus of the servers 2 or the management server 3 in response to a function or a role of a guest OS, a user or the like. The server 2 or the management server 3 copies (performs cloning of) a cloning master image corresponding to a VM guest 20 to be produced (guest OS that is to operate on the VM guest 20) from among the plurality of kinds of cloning master images to produce a guest OS.

Further, at least one virtual disk is allocated to each of the VM guests 20. For example, a virtual disk 6a is allocated to the VM guest 20a and a virtual disk 6b is allocated to the VM guest 20b. It is to be noted that the virtual disks 6a and 6b are allocated to predetermined physical regions of physical disks 40-1 to 40-3 of the physical storage apparatus 4.

Here, the information processing apparatus 1 as an example of the present embodiment adopts the thin provisioning method. A relationship between the physical disks 40-1 to 40-m and the virtual disks 6-1 to 6-m in the thin provisioning method is described below with reference to FIG. 2.

As depicted in FIG. 2, the physical storage apparatus 4 includes at least one physical disk, for example, m physical disks 40-1 to 40-m (where they are not distinguished from each other, each of them is hereinafter referred to simply as physical disk 40). It is to be noted that, in FIG. 1, an example is depicted in which the physical storage apparatus 4 includes three physical disks 40-1 to 40-3 from among the physical disks 40.

The physical disks 40 are various kinds of devices such as a magnetic disk apparatus such as an HDD (Hard Disk Drive) or a semiconductor drive apparatus such as an SD (Solid State Drive) and are hardware for storing various data, programs and so forth.

At least one physical disk 40 is allocated to each of virtual storages 5-1 to 5-i (where they are not distinguished from each other, each of them is hereinafter referred to simply as virtual storage 5), and the total capacity of allocated physical regions is managed as a capacity of the virtual storage 5 (refer to FIG. 5).

The virtual disks 6-1 to 6-n (where they are not distinguished, each of them is hereinafter referred to simply as virtual disk 6) are logical disks each produced by allocating the capacity of the virtual storage 5 to which the virtual disk 6 belongs (refer to FIG. 3). The virtual disks 6 are cut out from the virtual storage 5 and allocated to a VM guest 20 when the VM guest 20 is produced or when an existing VM guest 20 requests an additional virtual disk 6. It is to be noted that the virtual disk 6a depicted in FIG. 1 represents at least one virtual disk 6 from among the virtual disks 6, and the virtual disk 6b represents at least one virtual disk 6 from among the virtual disks 6.

It is to be noted that the physical storage apparatus 4 converts or allocates a virtual address (physical block) of an accessing target relating to an I/O request (accessing request) from the VM guest 20 into or to a physical address (physical block) in the physical disk 40 to execute accessing such as I/O. To this end, the physical storage apparatus 4 includes an allocation unit 41a and an allocation management table 42a hereinafter described.

The storage controlling apparatus 10 manages the relationship between the physical disks 40 and the virtual disks 6 depicted in FIG. 2 and described above, and performs control of the servers 2 and the physical storage apparatus 4. The storage controlling apparatus 10 performs temporary reservation (tentative reservation) of a plurality of physically successive physical blocks (blocks; allocation unit regions) of the physical disks 40-1 to 40-3 included in the physical storage apparatus 4, for example, for the virtual disk 6b allocated to the VM guest 20b to be newly produced in the server 2-1.

[1-2] Description of the Storage Controlling Apparatus

Now, the storage controlling apparatus 10 according to the present embodiment is described with reference to FIGS. 1 and 3 to 6. It is to be noted that FIG. 3 is a view illustrating an example of a virtual disk management table 14a stored in a DB 14 depicted in FIG. 1, and FIG. 4 is a view illustrating an example of a VM guest management table 14b. Further, FIG. 5 is a view illustrating an example of a virtual storage management table 14c and FIG. 6 is a view illustrating an example of a physical disk management table 14d.

As depicted in FIG. 1, the storage controlling apparatus 10 includes an I/O request acceptance unit 11, an I/O execution unit 12, a region allocation controlling unit 13 and a DB (Database) 14.

The I/O request acceptance unit 11 accepts an I/O request generated in any VM guest 20 (guest OS) of the server 2.

The I/O execution unit (history outputting unit) 12 executes an I/O request from the I/O request acceptance unit 11. In particular, the I/O execution unit 12 issues an I/O request to the physical storage apparatus 4. Further, the I/O execution unit 12 outputs an I/O history to the region allocation controlling unit 13 after each predetermined time period or at a predetermined timing such as when the storage controlling apparatus 10 is accessed. It is to be noted that, when an I/O history is outputted after every predetermined time period, at least an identifier (virtual disk identifier) for specifying the virtual disk 6 allocated to the deployed VM guest 20, a number of times of I/O (number of times of accessing) and an average data transfer amount are included in the I/O history. Further, where an I/O history is outputted when the storage controlling apparatus 10 is accessed, at least a virtual disk identifier and a data transfer amount are included in the I/O history.

It is to be noted that the I/O request acceptance unit 11 and the I/O execution unit 12 are provided for each server 2.

The DB (retention unit) 14 retains the tables 14a to 14d illustrated in FIGS. 3 to 6.

[1-2-1] Description of the Region Allocation Controlling Unit and Tables

Here, a configuration of the region allocation controlling unit 13 and the tables retained by the DB 14 are described.

The region allocation controlling unit (controller) 13 controls temporary reservation of successive blocks of a physical disk 40 on a virtual disk 6, and includes a monitoring unit 13a, an estimation unit 13b, a temporary reservation unit 13c and a cancellation unit 13d.

The monitoring unit 13a performs monitoring of accessing to an existing virtual disk 6 allocated to an existing virtual machine 20 and stores a result of the monitoring into the DB 14. In particular, where an I/O history is outputted from the I/O execution unit 12 when the virtual disk 6 is accessed, the monitoring unit 13a totalizes the number of times of accessing, the average data transfer amount and so forth for every predetermined time period for each virtual disk identifier and stores a result of the totalization as a monitoring result into the virtual disk management table 14a of the DB 14. It is to be noted that, where the storage controlling apparatus 10 is configured such that an I/O history is outputted from the I/O execution unit 12 after every predetermined time period, the monitoring unit 13a may be omitted. Where the monitoring unit 13a is omitted, the region allocation controlling unit 13 stores the I/O history outputted from the I/O execution unit 12 as the monitoring result of each virtual disk 6 into the virtual disk management table 14a.

The virtual disk management table 14a is a table for storing a monitoring result for each virtual disk 6 therein, and includes, for example, information illustrated in FIG. 3 for each virtual disk identifier. Disk capacity is a capacity allocated to a virtual disk 6, and Actual disk use amount is a capacity actually allocated already to a physical disk 40 from within the disk capacity and State is information representative of whether or not the virtual disk 6 is normal. Virtual storage identifier is information for specifying the virtual storage 5, and Allocation destination VM guest is information representative of a VM guest 20 to which the virtual disk 6 is allocated and, for example, a VM guest identifier that specifies a VM guest 20 is set in the virtual storage identifier. Temporary reservation performance target is information (YES/NO) representative of whether or not temporary reservation on the virtual disk 6 has been performed, and Temporary reservation amount represents a remaining (latest) temporarily reserved capacity and Temporary reservation performance amount represents a capacity temporarily reserved by the temporary reservation unit 13c.

I/O history (1) to I/O history (N) individually retain an I/O history within every predetermined time period (unit time; for example, 10 minutes) for y days (for example, for 7 days), namely, totaling N I/O histories (for example, in the case of 7 days at a time interval of 10 minutes, N=1008). Where the number of I/O histories exceeds N, the oldest history is discarded and a new history is set. In the example illustrated in FIG. 3, each I/O history includes a number of times of I/O, an average data transfer amount and a capacity actually allocated already to the disk at a point of time at which the I/O history is set. For example, in the I/O history (1) of "disk0001", the number of times of I/O "5 times", the average data transfer amount "4 MB" and the capacity actually allocated already to the disk "30 GB" are included.

Taking notice of the server 2-1, a case is assumed wherein an instruction for production of a new VM guest 20 is issued from the user, a manger or the like and an instruction for production of the virtual disk 6b, namely, at least one virtual disk 6, is issued. It is to be noted that the new VM guest 20b is to be produced from a cloning master image same as that of the existing VM guest 20a.

The estimation unit 13b estimates an accessing amount (accessing frequency) to the virtual disk 6b allocated to the new VM guest 20b based on the monitoring result (accessing frequency) of the accessing to the existing virtual disk 6a allocated to the existing VM guest 20a. Here, the accessing amount is information indicating a degree of accessing calculated based, for example, on the number of times of I/O and the average data transfer amount included in the I/O history, and indicates, for example, an accessing frequency.

As the cloning master image, a plurality of kinds of images are prepared in advance in response to a function, a role and so forth of the guest OS as described above. In particular, it can be anticipated that VM guests 20 (guest OSs) produced from the same cloning master image exhibit a similar tendency also in regard to the behavior. Therefore, the estimation unit 13b according to the present embodiment recognizes the VM guest 20a deployed in the past from a kind of cloning master image same as that of the VM guest 20b to be produced based on the VM guest management table 14b. Then, the estimation unit 13b estimates a tendency (accessing frequency) of the behavior to the new virtual disk 6b by the VM guest 20b to be produced based on a use method of the virtual disk 6a by the recognized VM guest 20a, for example, based on an accessing tendency such as the accessing number of times to the virtual disk 6a or the average data transfer amount.

In the VM guest management table 14b, information depicted, for example, in FIG. 4 is included for each VM guest identifier. Logical CPU and Logical memory are a processing ability and a logical capacity allocated by a CPU (Central Processing Unit) 21 and a memory 22 (refer to FIG. 8) of the server 2 hereinafter described, respectively. VM host identifier is an identifier for specifying a VM host executed by the VM guest 20. Cloning master image identifier is information for specifying a cloning master image on which the VM guest 20 is based. Deployment date and time is information indicating date and time at which the VM guest 20 was deployed (produced). Virtual disk identifier is information for specifying a virtual disk 6 allocated to the VM guest 20 as described above (refer to FIG. 3), and a coupling device name of the virtual disk 6 in the VM guest 20 is set in the brackets. It is to be noted that, in the example depicted in FIG. 4, the VM guests 20 whose VM guest identifier is "guest0001" and "guest0005" are produced from the same cloning master image (cloning master image identifier: "image0001").

For example, if a production instruction of a new VM guest 20b based on the cloning master image is issued by a user, a manager or the like, then the estimation unit 13b extracts the VM guest 20a having the cloning master image identifier same as that of the VM guest 20b to be produced from the VM guest management table 14b. Then, the estimation unit 13b refers to the virtual disk management table 14a based on the virtual disk identifier allocated to the extracted VM guest 20a to calculate an average accessing amount (accessing frequency), for example, of the I/O histories (1) to (N) and estimates the calculated accessing amount as an accessing amount (accessing frequency) to a new virtual disk 6. It is to be noted that a technique for calculating an accessing amount is hereinafter described.

The temporary reservation unit 13c temporarily reserves, when the estimated accessing amount (accessing frequency) exceeds a threshold value (first threshold value), a plurality of physically successive blocks (allocation unit regions) of the physical disk 40 in the physical disk management table 14d in order to allocate the physical successive blocks in the future to a new virtual disk 6 to be produced. In particular, the temporary reservation unit 13c determines whether or not temporary reservation of the successive blocks of the physical disk 40 is to be performed in response to whether or not the accessing amount estimated by the estimation unit 13b exceeds the first threshold value. In other words, the temporary reservation unit 13c determines whether or not temporary reservation is to be performed based on a result of the estimation of the accessing amount of the new virtual disk 6 by the estimation unit 13b.

Further, the temporary reservation unit 13c determines a temporary reservation performance amount to be allocated to the new virtual disk 6b based on the monitoring result of the use amount of the existing virtual disk 6a, for example, on the actual disk use amount of the virtual disk management table 14a, and temporarily reserves a plurality of successive blocks for the new virtual disk 6b corresponding to the determined temporary reservation performance amount. In particular, the temporary reservation unit 13c determines a size to be temporarily reserved on the new virtual disk 6b based on the actual use amount (use amount) of the existing virtual disk 6a.

In the physical disk management table 14d, information depicted, for example, in FIG. 6 is included for each physical disk identifier for specifying a physical disk 40. Block number is a number for specifying a block of the physical disk 40, and a maximum value of the block number is determined depending upon the capacity (size) of the individual physical disk 40. State is information representative of whether or not the physical disk 40 is normal. Allocation state is information representative of a state of allocation of the virtual disk 6 to the block number, and, for example, a state of "non-allocated" in which a virtual disk 6 is not allocated to the block, another state of "allocated" in which a virtual disk 6 is allocated already and a further state of "temporarily reserved" in which temporary reservation is performed by the temporary reservation unit 13c and so forth are available. Allocation destination virtual storage is information for specifying a virtual storage 5 allocated to the physical disk 40 and is indicated, for example, by a physical storage identifier. Allocation destination virtual disk is information for specifying a virtual disk allocated to the block number and is indicated, for example, by a physical disk identifier.

In this manner, the temporary reservation unit 13c does not perform temporary reservation of a block on all of the virtual disks 6 and preferentially determines, as a performance target of the temporary reservation, a new virtual disk 6b with regard to which it is estimated by the estimation unit 13b that the frequency of I/O becomes high based on the I/O history (actual result) of the existing VM guest 20a. Consequently, since reading and writing of data can be performed sequentially for the temporarily reserved successive blocks while the advantages of the thin provisioning method that the physical disk 40 can be utilized efficiently are taken, degradation of the temporarily reserved I/O performance can be prevented.

It is to be noted that the temporary reservation unit 13c may refer to the virtual storage management table 14c and stop, when an unused amount of the virtual storage 5 to which the new virtual disk 6b belongs is smaller than a threshold value (second threshold value), temporary reservation of a plurality of successive blocks on the new virtual disk 6b. In particular, where an unused amount of the virtual storage 5 is smaller (exhausted) than the second threshold value (for example, 5%), the temporary reservation unit 13c stops new temporary reservation.

The virtual storage management table 14c is a table indicating a use situation of each virtual storage and includes, for example, information illustrated in FIG. 5 for each virtual storage identifier. Capacity is a capacity allocated from the physical disk 40 to the virtual storage 5, and Use amount is a total capacity of blocks whose allocation state exhibits "allocated" from among those of the physical disk 40 belonging to the virtual storage 5 (refer to FIG. 6). Temporary reservation amount is a total capacity of blocks whose allocation state exhibits "temporarily reserved" from among those of the physical disk 40 belonging to the virtual storage 5, and Unused amount is a total capacity of blocks whose allocation state exhibits "non-allocated" from among those of the physical disk 40 belonging to the virtual storage 5.

It is to be noted that the capacity of the virtual storage 5 is equal to the sum of the use amount, temporary reservation amount and unused amount of the virtual storage 5, and the capacity of the virtual disk 6 is equal to or greater than the sum of the actual disk use amount and the temporary reservation amount of the virtual disk 6.

Now, detailed operation of the estimation unit 13b and the temporary reservation unit 13c is described.

The temporary reservation unit 13c cooperates with the estimation unit 13b to perform processes (i) to (iv) hereinafter described to decide whether or not temporary reservation of each virtual disk 6 included in a virtual disk 6b to be newly produced is required, and performs a process (v) hereinafter described to perform determination of a temporary reservation performance amount.

It is to be noted that it is assumed that a cloning master image to be used for production of a new VM guest 20b (guest OS) and a virtual disk 6b to be allocated to the new VM guest 20*b* and a coupling device name of the virtual disk 6*b* are designated in advance by a user, a manager or the like.

(i) The estimation unit 13*b* selects a plurality of (for example, three) VM guests 20 from among VM guests 20 deployed from a cloning master image same as that of a VM guest 20*b* to be newly deployed. For example, the estimation unit 13*b* refers to the VM guest management table 14*b* (refer to FIG. 4) to select those VM guests 20*a* whose elapsed time period after deployment is equal to or longer than a predetermined time period (for example, one day) and whose elapsed time period after deployment is shortest, middle and longest.

(ii) The estimation unit 13*b* extracts a virtual disk 6 corresponding to a device path (coupling device name; for example, scsi 0:0, scsi 0:1, . . . , ide 0:0 or the like; refer to FIG. 4) of the virtual disk 6*b* of the VM guest 20*b* to be newly deployed from among the VM guests 20 selected in the process (i) based on the virtual disk management table 14*a* (refer to FIG. 3).

It is to be noted that, where the number of VM guests 20 that satisfy the condition in the process (i) is less than three, or where there is no virtual disk 6 corresponding to the device path in at least one of the three VM guests 20 in the process (ii), the estimation unit 13*b* decides that history information to be used as a hint when an accessing amount in a VM guest 20 to be newly produced is estimated is not collected sufficiently and then ends the processing. In those cases, the temporary reservation unit 13*c* decides that the temporary reservation on the virtual disk 6 to be allocated to the certain VM guest 20 to be newly produced is "NO".

(iii) The estimation unit 13*b* performs processes (iii-1) and (iii-2) described below for each of the three virtual disks 6 extracted in the process (ii) above.

(iii-1) For each of the virtual disks 6, I/O histories whose "number of times of I/O×average data transfer amount" is maximum in a predetermined time period (for example, one day) are extracted from within the virtual disk management table 14*a*.

(iii-2) For each of the virtual disks 6, a number of value (I/O histories) of the process (iii-1) just described equal to the number of days of the histories stored in the virtual disk management table 14*a* are extracted, and an average value of the extracted values is calculated as an I/O frequency value (accessing frequency value) of the virtual disk 6. It is to be noted that the I/O frequency value calculated here is used as the access ing amount (access ing frequency) described above by the temporary reservation unit 13*c*.

(iv) The temporary reservation unit 13*c* decides that temporary reservation is "required" if the I/O frequency value calculated in the process (iii) described above exceeds the first threshold value, for example, 30 MB. On the other hand, the temporary reservation unit 13*c* decides that temporary reservation is "not required" if the I/O frequency value is less than the first threshold value.

(v) Then, the temporary reservation unit 13*c* calculates a temporary reservation performance amount relating to the virtual disks 6 decided that temporary reservation is "required" in the process (iv) described above. In particular, the temporary reservation unit 13*c* performs calculation of an expression (1) given below for the three virtual disks 6 extracted in the process (ii) described above and determines an average value of the calculated values as the temporary reservation performance amount of the virtual disk 6 decided that temporary reservation is "required" in the process (iv) described above. It is to be noted that, in the following expression (1), z indicates a number of days after deployment of the VM guest 20 and y indicates a number of days stored in a I/O history.

$$\text{Max}(1-z/y,0) \times \text{temporary reservation amount} + \text{use amount} \qquad (1)$$

Here, in the expression (1), it is regarded that the reliability of the temporary reservation amount of the VM guest 20 degrades as the number of elapsed days after deployment of the VM guest 20 increases. In particular, if a temporary reservation performance amount is calculated in accordance with the expression (1), then the temporary reservation amount of the VM guest 20 whose number of elapsed days is long is less likely to be reflected on a result of the calculation of the temporary reservation performance amount of a new virtual disk 6*b*. Consequently, since a weighted numerical value of a use situation of the latest VM guest 20 is calculated, the temporary reservation unit 13*c* can set an optimum temporary reservation performance amount to a new virtual disk 6.

It is to be noted that, where the region of successive unused blocks on the physical disk 40 allocated to the virtual storage 5 is smaller than the temporary reservation performance amount calculated in the process (v) described above, the temporary reservation unit 13*c* temporarily reserves a maximum range from within the region of successive unused blocks.

If accessing involving allocation of a physical region to a virtual disk 6 belonging to the virtual storage 5 occurs when the unused amount of the virtual storage 5 is smaller than a threshold value (third threshold value), then the cancellation unit 13*d* cancels at least part of a plurality of blocks temporarily reserved on the virtual disk 6. In particular, the cancellation unit 13*d* cancels at least part of a plurality of blocks temporarily reserved on the virtual disk 6 whose accessing amount obtained from the monitoring result, namely, accessing frequency to the existing virtual disk 6, is low from within at least one virtual disk 6 belonging to the virtual storage 5. In particular, where an unused amount of the virtual storage 5 is less than (exhausted) the third threshold value (for example, 1%) that is lower than the second threshold value (for example, 5%) (or where the non-use amount becomes zero), the cancellation unit 13*d* cancels part or all of temporary reservations to restore a non-allocated state so that a block of the physical disk 40 is allocated to the virtual disk 6 that actually requires a block of the physical disk 40.

More particularly, if the unused amount of the virtual storage 5 becomes smaller than the third threshold value, then the cancellation unit 13*d* performs processes (vi) and (vii) described below to cancel temporary reservations to restore an unused state.

(vi) Based on the virtual disk management table 14*a*, I/O frequency values of all virtual disks 6 that utilize a physical disk 40 belonging to a virtual storage 5 whose unused amount becomes smaller than the third threshold value are calculated, and the calculated I/O frequency values are sorted in an ascending order.

(vii) The temporary reservation of the virtual disk 6 whose I/O frequency value is lowest is cancelled from the physical disk management table 14*d*. It is to be noted that, where there are a plurality of virtual disks 6 having I/O frequency values equal to each other, the cancellation unit 13*d* preferentially performs cancellation of the temporary reservation having a great temporary reservation amount.

In this manner, when a situation in which the unused amount of the virtual storage 5 is exhausted is entered, the temporary reservation unit 13c first stops the temporary reservation and then the cancellation unit 13d cancels the temporary reservation of a temporarily reserved block that is not used actually. Consequently, the physical region can be utilized efficiently.

It is to be noted that the cancellation unit 13d performs cancellation of a temporarily reserved block until at least a region having a size equal to or greater than that to be written by generated accessing becomes free.

It is to be noted that the tables 14a to 14d described above are updated by the region allocation controlling unit 13 when a VM guest 20 or a virtual disk 6 is produced, changed, deleted or the like. Further, a use amount, a temporary reservation amount, a state and so forth of the virtual storage 5 or the virtual disk 6 are updated by the region allocation controlling unit 13 after every predetermined time period or at a predetermined timing.

[1-3] Description of the Physical Storage Apparatus

Now, the physical storage apparatus 4 according to the present embodiment is described with reference to FIGS. 1 to 7. It is to be noted that FIG. 7 is a view illustrating an example of an allocation management table 42a stored in the physical storage apparatus 4 depicted in FIG. 1. The physical storage apparatus 4 includes an allocation unit 41a and retains the allocation management table 42a.

The allocation management table 42a is a table for associating virtual addresses (virtual blocks) of the virtual disks 6 and physical addresses (physical blocks) of the physical disks 40 with each other. As depicted in FIG. 7, the allocation management table 42a associates virtual blocks of the virtual disks 6 allocated for individual block numbers, namely, allocation unit regions in the virtual disks 6, with the physical disk management table 14d illustrated in FIG. 6.

The allocation unit 41a converts a virtual block of an accessing target according to an I/O request (accessing request) from a VM guest 20 into a physical block based on the allocation management table 42a to execute I/O. Further, if an access involving allocation of a physical region to a virtual disk 6 occurs, then the allocation unit 41a allocates a region (virtual block) of an accessing target to at least part of a plurality of successive blocks temporarily reserved on the certain virtual disk 6 based on the allocation management table 42a. It is to be noted that the allocation unit 41a does not allocate any other virtual disk 6 to a physical block in the "temporarily reserved" state in the allocation management table 42a.

It is to be noted that, if an access involving allocation of a physical region to a virtual disk 6 belonging to the virtual storage 5 occurs where the unused amount of the virtual storage 5 is smaller than the third threshold value as described above, the cancellation unit 13d cancels at least part of a plurality of blocks temporarily reserved on the virtual disk 6. In this case, the allocation unit 41a allocates an accessing region of the virtual disk 6 relating to the accessing to at least part of a plurality of physical blocks cancelled by the cancellation unit 13d.

Here, the physical disk management table 14d and the allocation management table 42a can be updated mutually by the storage controlling apparatus 10 and the physical storage apparatus 4. For example, when a temporary reservation is executed or cancelled and then the physical disk management table 14d is updated, the storage controlling apparatus 10 reflects the update substance also on the allocation management table 42a at the same time or at a predetermined timing. Further, when an allocation state between a logical block and a physical block is updated in response to an access involving allocation or deletion of a physical region to or from a virtual disk 6, the physical storage apparatus 4 reflects the update substance also on the physical disk management table 14d at the same time or at a predetermined timing.

In this manner, the physical storage apparatus 4 and the storage controlling apparatus 10 reflect at least the allocation state of a physical block on each other. Consequently, it can be reduced by the allocation unit 41a that a block temporarily reserved by the temporary reservation unit 13c is allocated to any other virtual disk 6, and it can be reduced by the temporary reservation unit 13c that a physical block allocated already to a different virtual disk by the allocation unit 41a is temporarily reserved.

It is to be noted that, while the example is described above in which the storage controlling apparatus 10 and the physical storage apparatus 4 retain the physical disk management table 14d and the allocation management table 42a, respectively, the present technology is not limited to this. For example, the storage controlling apparatus 10 may omit retaining the physical disk management table 14d while the physical storage apparatus 4 retains the allocation management table 42a. In this case, updating of the state of temporary reservations by the temporary reservation unit 13c and the cancellation unit 13d may be performed for the allocation management table 42a by the storage controlling apparatus 10.

Further, while the example is described above in which the allocation management table 42a is a table in which Virtual block is additionally provided in the physical disk management table 14d, the present technology is not limited to this. The allocation management table 42a may include at least information for specifying a physical disk 40 (for example, Physical disk identifier), Physical block number, Allocation state, information for specifying a virtual disk 6 of an allocation destination (for example, Virtual disk identifier) and Virtual block.

[1-4] Example of the Hardware Configuration of the Information Processing Apparatus Now, an example of a hardware configuration of the information processing apparatus 1 according to the present embodiment is described with reference to FIG. 8. It is to be noted FIG. 8 is a block diagram depicting an example of a hardware configuration of the information processing apparatus 1 depicted in FIG. 1.

Figure 8:
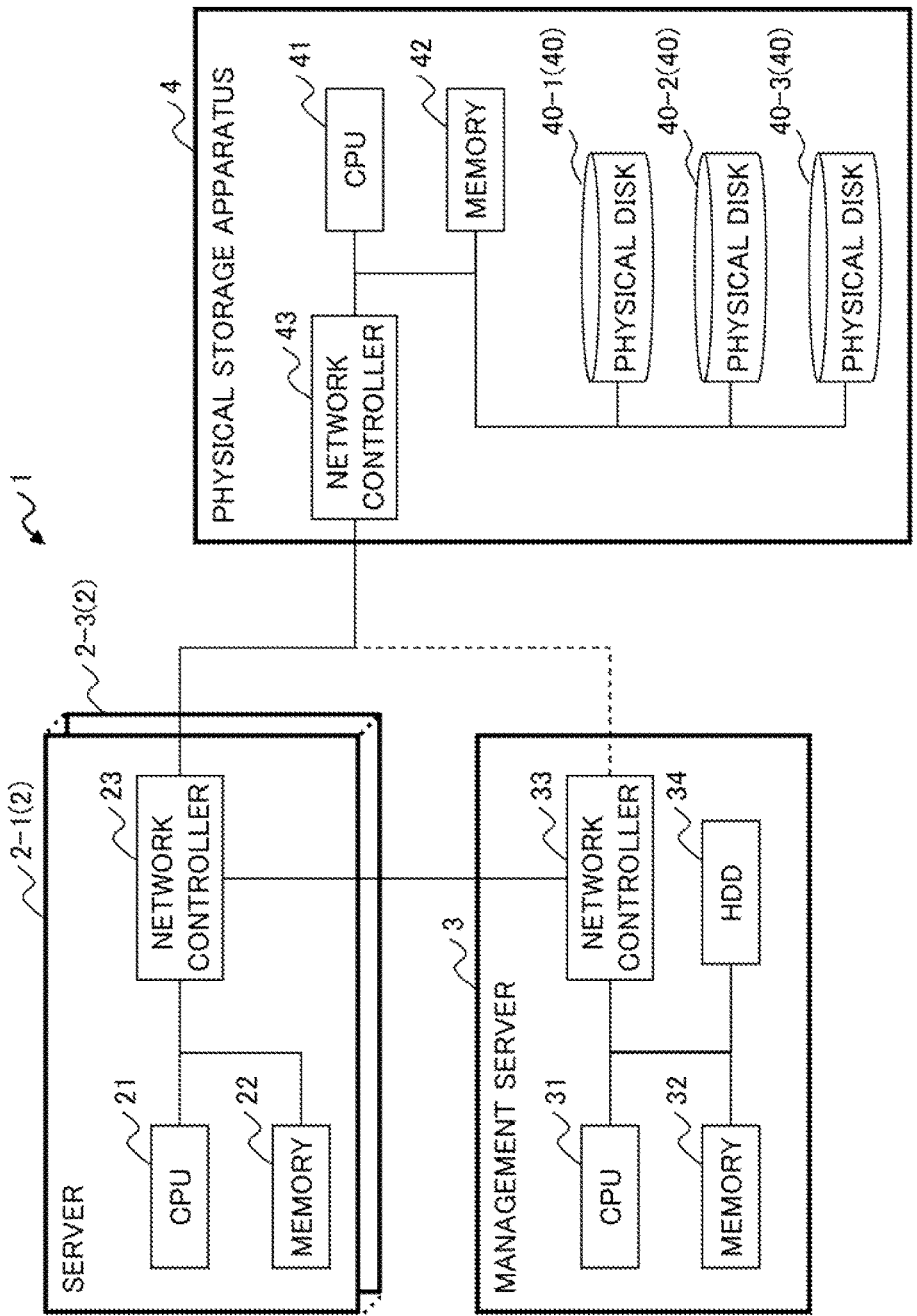
FIG. 8 is a block diagram depicting an example of a hardware configuration of the information processing apparatus depicted in FIG. 1.

As depicted in FIG. 8, the information processing apparatus 1 includes the plurality of servers 2 (2-1 to 2-3) described above, the management server 3 and the physical storage apparatus 3 described above.

Each of the serves 2 includes at least the CPU 21, the memory 22 and a network controller 23. In particular, each of the servers 2 logically divides a resource such as the CPU 21 or the memory 22 by a VM host and allocates the divisional resources to the VM guests 20 to be executed thereby.

The management server 3 is an electronic computer for executing management of the resources of the servers 2 and the physical storage apparatus 4 and various controls, and includes at least a CPU 31, a memory 32, a network controller 33 and an HDD 34.

The physical storage apparatus 4 includes the physical disk 40 described above and includes at least a CPU 41, a memory 42 and a network controller 43.

The HDD 34 is used, for example, as the DB 14 hereinafter described of the storage controlling apparatus 10. It is to be noted that various devices such as an SD or a nonvolatile memory may be used in place of the HDD 34.

The CPUs 21, 31 and 41 are processing apparatus that are coupled with the corresponding memories 22, 32 and 42, network controllers 23, 33, and 43 and HDD 34 through a bus (a controller and so forth), respectively, and perform various controls or arithmetic operations. The CPUs 21, 31 and 41 execute programs stored in the memories 22, 32 and 42 or in a ROM (Read Only Memory) or the like not depicted to implement various functions.

For example, the CPU 21 according to the present embodiment implements functions as virtualization software (VM host) for executing a VM guest 20 (guest OS) and functions as the I/O request acceptance unit 11 and the I/O execution unit 12. Meanwhile, the CPU 31 according to the present embodiment implements a function as the region allocation controlling unit 13 of the storage controlling apparatus 10. In particular, the storage controlling apparatus 10 according to the present embodiment is implemented by the servers 2 and the management server 3. It is to be noted that, for the convenience of illustration, the I/O request acceptance unit 11 and the I/O execution unit 12 are depicted at the outside of the server 2 in FIG. 1.

Further, the CPU 41 according to the present embodiment implements a function as the allocation unit 41a.

The memories 22, 32 and 42 are storage apparatus for temporarily storing various kinds of data or programs therein, and temporarily store, develop and use data or programs therein when the CPUs 21, 31 and 41 execute the programs. It is to be noted that, as the memories 22, 32 and 42, a volatile memory such as, for example, a RAM (Random Access Memory) is available.

The memory 42 retains the allocation management table 42a. It is to be noted that the memory 42 may be used further as a cache memory for the physical storage apparatus 4. In this case, the memory 42 temporarily stores data to be written into the physical disks 40 from a VM guest 20, data read out from the physical disk 40 to the VM guest 20 and so forth.

The network controllers 23, 33 and 43 are a controller that perform interface control with a network controller of a coupling destination and perform various kinds of data communication. It is to be noted that, while the network controller 23 and the network controllers 33 and 43 in the example depicted in FIG. 8 are coupled for communication with each other, the present technology is not limited to this. For example, the network controllers 33 and 43 may be coupled for communication with each other as indicated by a broken line in FIG. 8.

[1-5] Example of Operation of the Storage Controlling Apparatus

Figure 9:
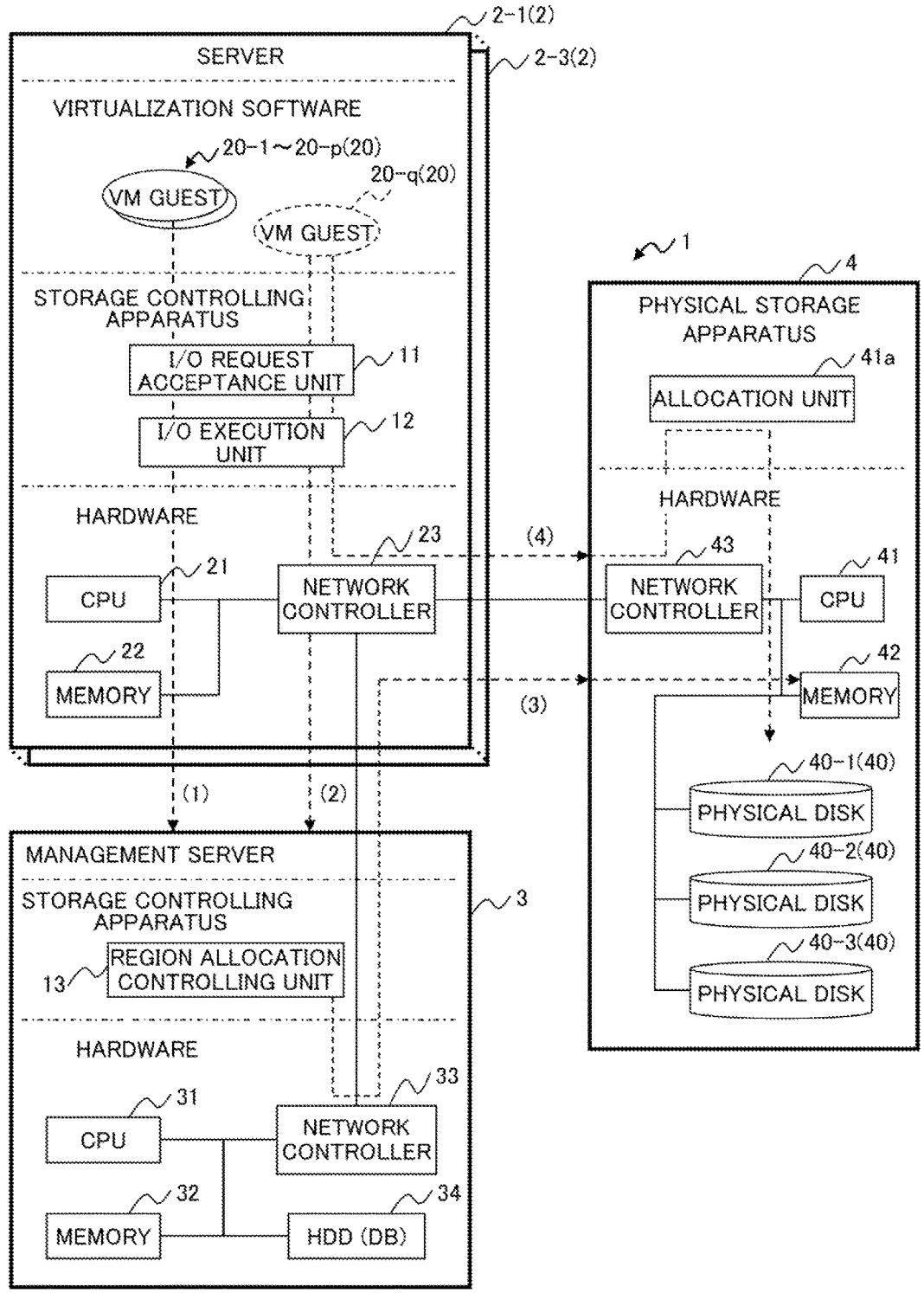
FIG. 9 is a view illustrating a process upon production of a VM guest in the storage controlling apparatus depicted in FIG. 1.
Figure 10:
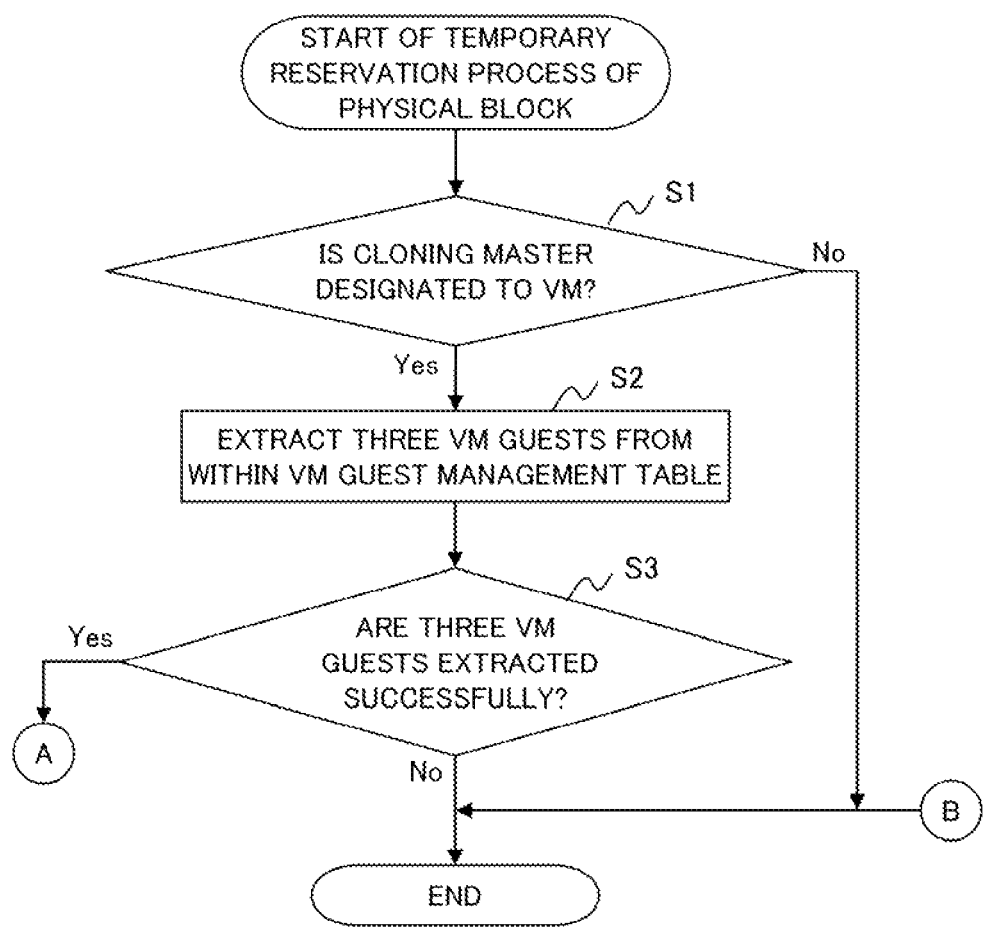
FIGS. 10 to 12 are flow charts illustrating an example of a temporary reservation process in the storage controlling apparatus depicted in FIG. 1.
Figure 11:
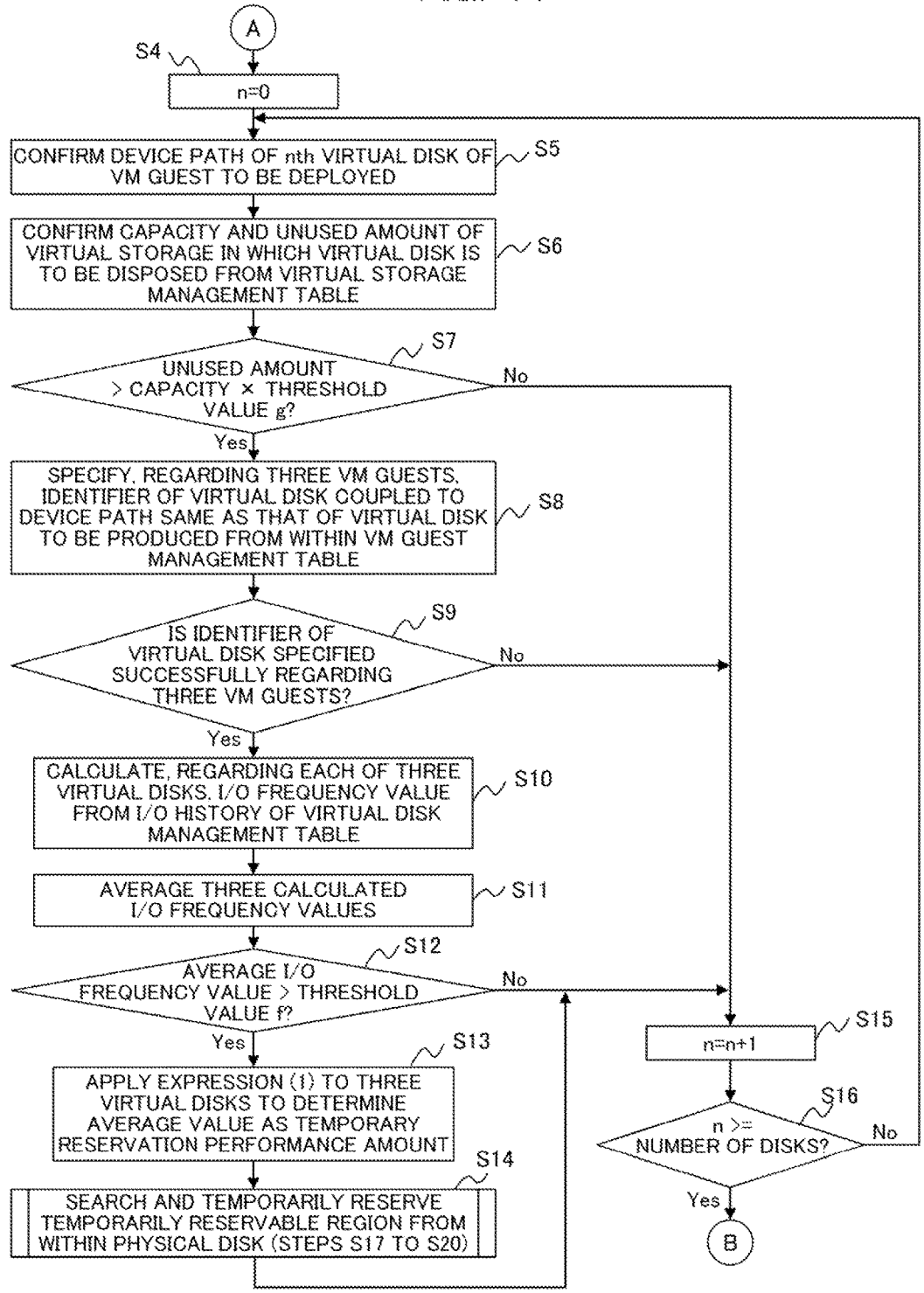
Figure 12:
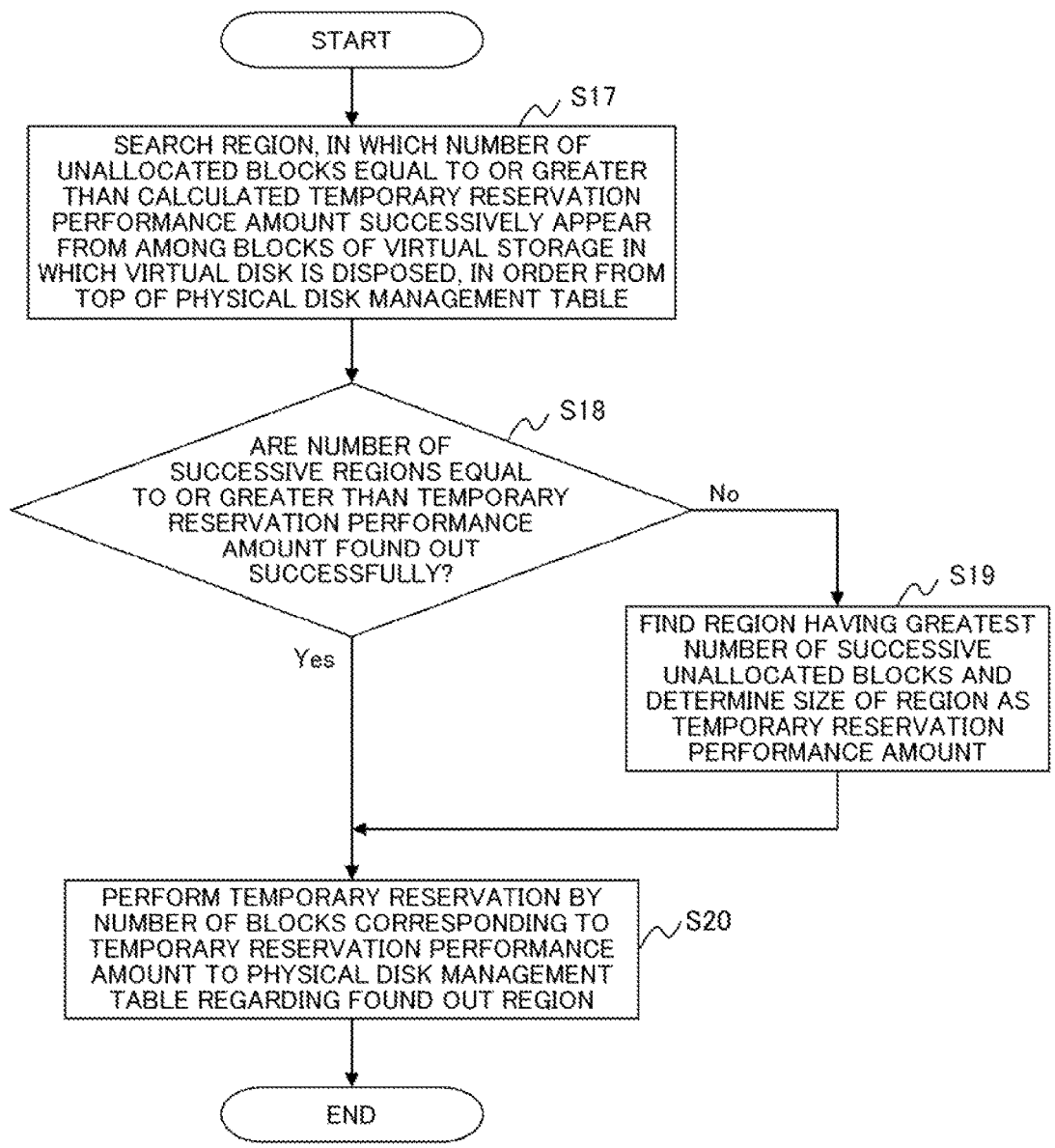
Figure 13:
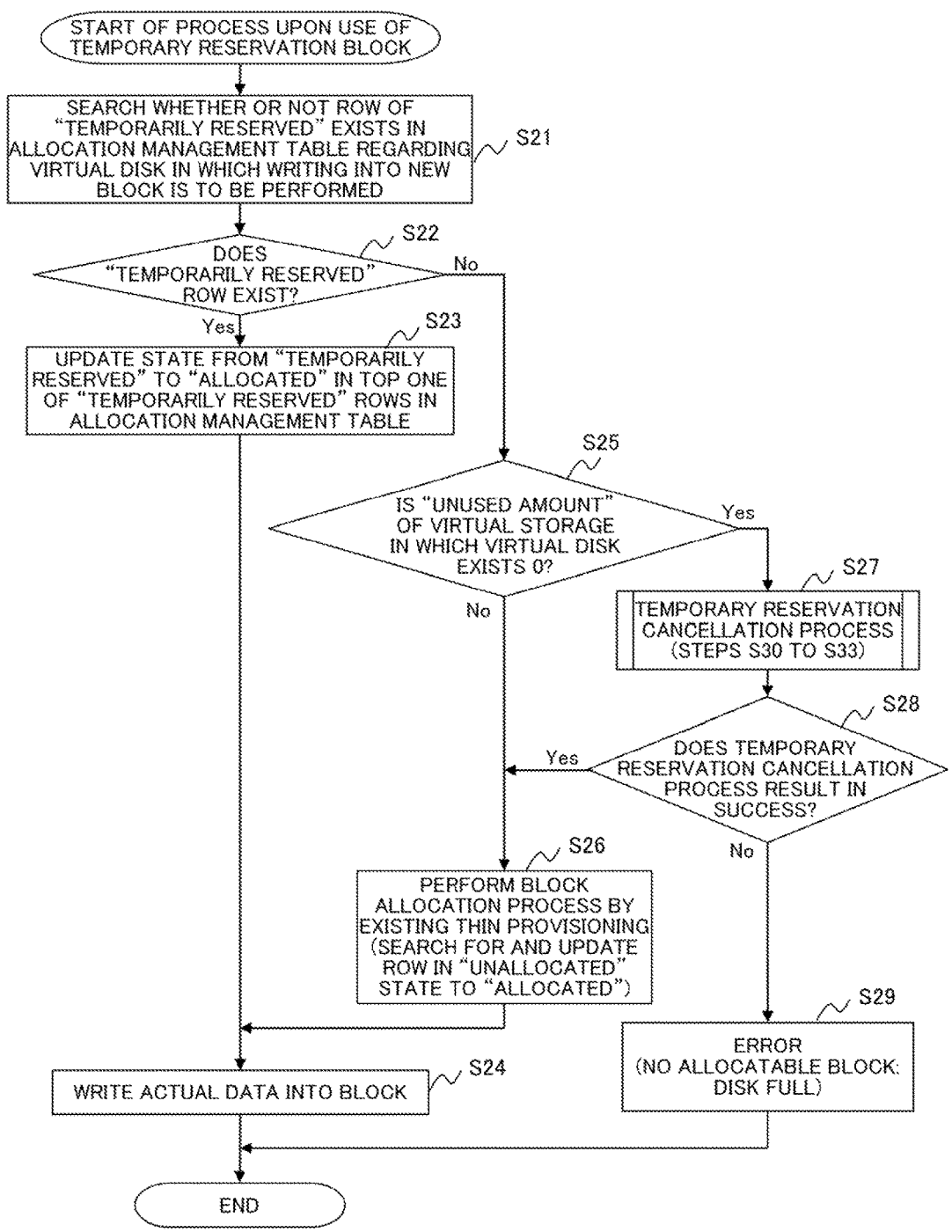
FIG. 13 is a flow chart illustrating an example of a process upon use of a temporary reservation block in the storage controlling apparatus depicted in FIG. 1.
Figure 14:
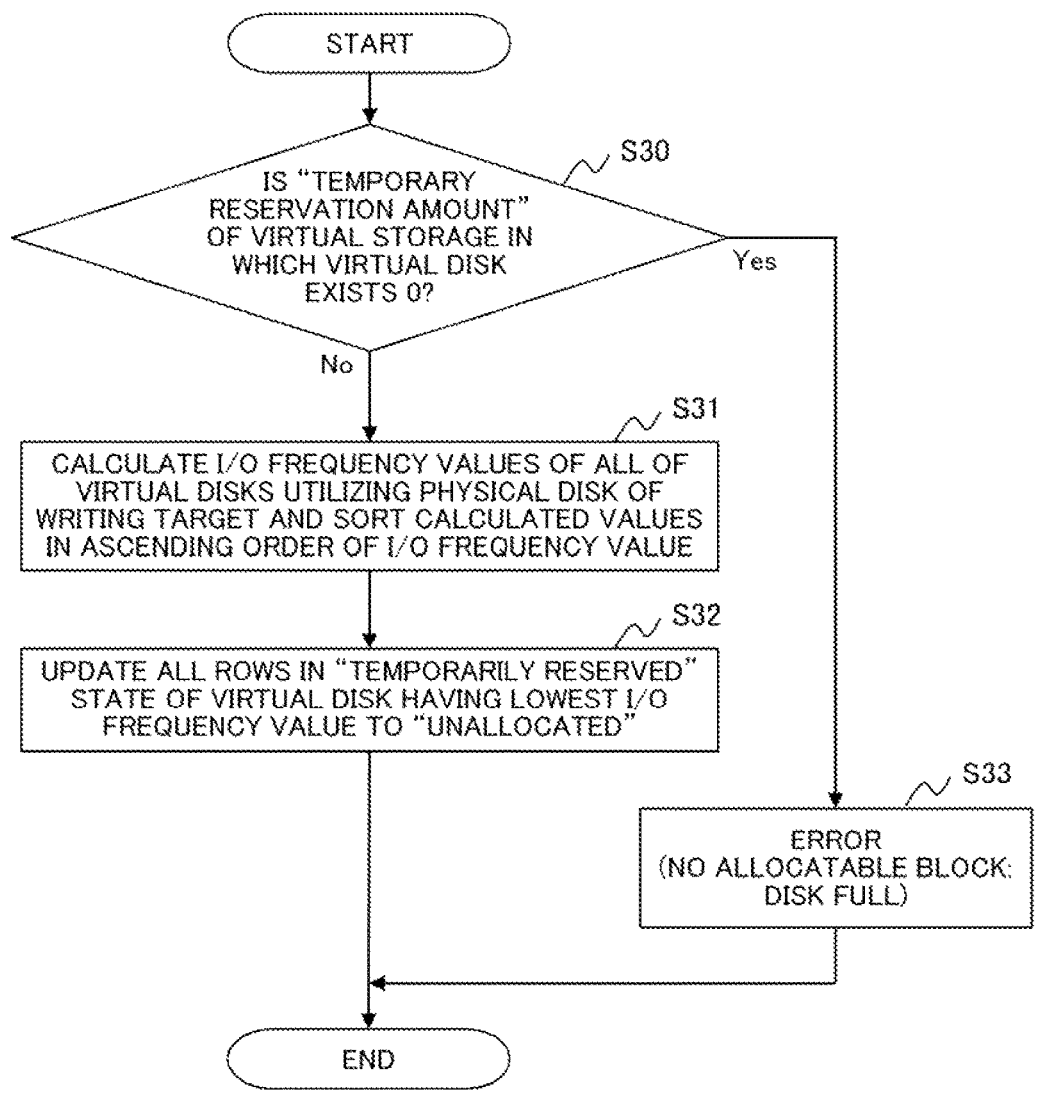
FIG. 14 is a flow chart illustrating an example of a temporary reservation cancellation process in the storage controlling apparatus depicted in FIG. 1.

Now, an example of operation of the information processing apparatus 1 configured in such a manner as described above is described with reference to FIGS. 9 to 13. FIG. 9 is a view illustrating a process upon production of a VM guest 20 in the storage controlling apparatus 10 depicted in FIG. 1. FIGS. 10 to 12 are flow charts illustrating an example of a temporary reservation process in the storage controlling apparatus 10 depicted in FIG. 1. FIG. 13 is a flowchart illustrating an example of a process upon use of a temporary reservation block, and FIG. 14 is a flow chart illustrating an example of a cancellation process of a temporary reservation.

[1-5-1] Temporary Reservation Process

First, an example of the temporary reservation process in the storage controlling apparatus 10 is described with reference to FIGS. 9 to 12. It is to be noted that, in the following description, it is assumed that, taking notice of the server 2-1, the VM guests 20-1 to 20-p are executed on virtualization software (VM host) to produce a new VM guest 20-q (VM guest identifier "VM00006"). Further, it is assumed that two new virtual disks 6 (coupling device names {"disk0", "disk1"}) are allocated to the VM guest 20-q to be newly produced and the VM guest 20-q is deployed from a cloning master image of a cloning master image identifier "image0001". Further, it is assumed that the time at present is "2011-09-26" and I/O histories by latest seven days (y=7) are recorded in the virtual disk management table 14a.

As depicted in FIG. 9, the storage controlling apparatus 10 transmits I/O histories of the VM guests 20-1 to 20-p operating already in the server 2 to the management server 3 by the I/O request acceptance unit 11 and the I/O execution unit 12, and the region allocation controlling unit 13 (monitoring unit 13a) stores the collected I/O histories as a result of the monitoring into the HDD (DB 14) of the management server 3 (refer to an arrow mark (1) of FIG. 9).

Then, if an instruction for deployment of a new VM guest 20-q is issued by a user, a manager or the like (refer to an arrow mark (2) of FIG. 9), then a temporary reservation process by the estimation unit 13b and the temporary reservation unit 13c is executed under the control of the region allocation controlling unit 13.

In particular, as depicted in FIG. 10, it is decided by the estimation unit 13b whether or not a cloning master image is designated to the new VM guest 20-q (step S1), and, if a cloning master image is not designated (No route at step S1), then the processing is ended. On the other hand, if a cloning master image is designated to the new VM guest 20-q (Yes route at step S1), then three VM guests 20 are extracted from within the VM guest management table 14b by the estimation unit 13b (step S2).

It is to be noted that, in the example of FIG. 9, by the estimation unit 13b, an existing VM guest 20 produced in accordance with a cloning master image identifier "image0001" to be used as a basis of the new VM guest 20-q is recognized based on the VM guest management table 14b. For example, there are five VM guests 20 produced with the cloning master image identifier "image0001" from among the VM guests 20-1 to 20-p (VM guest identifiers "VM0001" to "VM0005") and deployment date and time of the VM guests and an elapsed number of days after deployment are such as given below.

"VM0001": "2011-08-01 09:02", 56 days elapsed
"VM0002": "2011-08-10 13:28", 47 days elapsed
"VM0003": "2011-08-31 10:41", 26 days elapsed
"VM0004": "2011-09-23 23:55", 2 days elapsed
"VM0005": "2011-09-25 19:07", 0 day elapsed The estimation unit 13b sorts the table by the deployment time except those VM guests 20 whose deployment time is within one day from the time at present from among the recognized VM guests 20, and extracts elements at the top, end and middle of the sorted array. In the example described above, from among the five VM guests 20, the four VM guests 20 that have the VM guest identifiers "VM0001" to "VM0004" exhibit lapse of one day or more after the deployment. The estimation unit 13b selects the VM guests 20 having the VM guest identifiers "VM0001", "VM0002" and "VM0004" as the VM guests 20 whose elapsed time periods after deployment are the longest, middle and shortest from among the four VM guests 20. It is to be noted that, where the number of VM guests whose elapsed time periods after deployment are one day or more is an even number, the estimation unit 13b selects, for example, a VM guest 20 whose VM deployment date and time is older (whose elapsed number of days after deployment is longer) from between two middle VM guests 20.

Then, it is decided at step S3 of FIG. 10 whether or not three VM guests 20 are extracted successfully by the estimation unit 13b (step S3), and if three VM guests 20 are not extracted successfully (No route at step S3), then the processing is ended. On the other hand, if three VM guests 20 are extracted successfully (Yes route at step S3), then the processing advances to step S4 of FIG. 11, at which zero is substituted into a variable n indicative of {"disk0", "disk1"} of a device path (coupling device name) of the virtual disk 6.

Then, a device path of the nth virtual disk 6 of the VM guest 20 to be newly deployed is confirmed by the estimation unit 13b (step S5). Further, a capacity and an unused amount of the virtual storage 5 in which the virtual disk 6 is to be disposed are confirmed from the virtual disk management table 14a by the estimation unit 13b (step S6).

Then, it is decided by the estimation unit 13b whether or not the unused amount of the virtual storage 5 confirmed at step S6 is greater than the product of the capacity and a threshold value g (second threshold value) (step S7). If the unused amount is not greater than the product (No route at step S7), then the processing advances to step S15.

At step S15, the estimation unit 13b increments the variable n and decides whether or not the variable n is equal to or higher than the number of disks (here, two) (step S16). If the variable n is equal to or higher than the number of disks (Yes route at step S16), then since the decision is completed for all virtual disks 6 {"disk0", "disk1"} of the VM guest 20-q to be newly deployed, the processing is ended. On the other hand, if the variable n is lower than the number of disks (No route at step S16), then the processing advances to step S5.

On the other hand, if the unused amount is greater than the product of the capacity and the threshold value g (Yes route at step S7), then the estimation unit 13b specifies a virtual disk identifier coupled with a device path same as that of a virtual disk 6 to be produced from the VM guest management table 14b with regard to the three VM guests 20 (step S8).

Then, it is decided by the estimation unit 13b whether or not a virtual disk identifier is specified successfully with regard to the three VM guests 20 (step S9). Then, if the virtual disk identifier is not specified successfully (No route at step S9), then the processing advances to step S15. On the other hand, if a virtual disk identifier is specified successfully with regard to each of the three VM guests 20 (Yes route at step S9), then the estimation unit 13b calculates an I/O frequency value from an I/O history of the virtual disk management table 14a with regard to each of the three virtual disks 6 (step S10).

For example, the estimation unit 13b extracts an I/O history whose "I/O number of times×average data transfer amount" is maximum for each one day with regard to each of the selected VM guests 20 and averages the I/O histories extracted by the number of days of the histories stored in the virtual disk management table 14a to calculate an I/O frequency value. It is to be noted that, assuming that two virtual disks 6 are allocated to each VM guest 20, the VM guest and the I/O frequency values of the virtual disks 6 {"disk0", "disk1"} corresponding to the VM guest 20 are represented by VM guest identifiers-disk {I/O frequency value of disk0, I/O frequency value of disk1}. For example, it is assumed that the I/O frequency values with regard to the virtual disks 6 calculated by the estimation unit 13b are such as given below.

VM0001-disk {10.2 MB, 44.7 MB}
VM0002-disk {13.5 MB, 40.1 MB}
VM0004-disk {22.8 MB, 30.3 MB}

Then, an average of the calculated three I/O frequency values is calculated by the estimation unit 13b (step S11 of FIG. 11). In the example described above, an average is calculated as:
"disk0": "15.5 MB"
"disk1": "38.5 MB"

It is to be noted that calculation regarding "disk0" is performed when n is zero and calculation regarding "disk1" is performed when n is 1 (refer to No route at steps S15 and S16).

An average of the I/O frequency values of the virtual disks 6 is estimated as an I/O frequency value (accessing amount) of each of the virtual disk 6 {"disk0", "disk1"} to be allocated to the VM guest 20-q to be newly produced by the estimation unit 13b.

Then, it is decided by the temporary reservation unit 13c whether or not the estimated average I/O frequency value is higher than a threshold value f (first threshold value) for decision regarding whether or not temporary reservation is required (to be performed) (step S12). If the I/O frequency value is equal to or lower than the threshold value (No route at step S12), then it is decided by the temporary reservation unit 13c that the virtual disk 6 corresponding to the I/O frequency value is not a target of temporary reservation and the processing advances to step S15. On the other hand, if the average I/O frequency value is higher than the threshold value f (Yes route at step S12), then it is decided by the temporary reservation unit 13c that the virtual disk 6 corresponding to the I/O frequency value is a target of temporary reservation. For example, if the threshold value f is 30 MB, it is decided at step S12 by the temporary reservation unit 13c that, when n is zero, the I/O frequency value regarding the virtual disk 6 whose coupling device name is "disk0" is equal to or lower than the threshold value f (is not a target of temporary reservation) from between the two virtual disks 6 of "VM0006" to be newly deployed.

Further, the temporary reservation unit 13c decides that, when n is 1, the I/O frequency value regarding the virtual disk 6 whose coupling device name is "disk1" is higher than the threshold value f and determines only the virtual disk 6 of "disk1" as a performance target of the temporary reservation.

Then, by the temporary reservation unit 13c, the expression (1) given hereinabove is applied to the three virtual disks 6 with regard to which it is decided that the coupling device name thereof is a target of the temporary reservation, and an average value is determined as a temporary reservation performance amount (step S13 of FIG. 11).

For example, it is assumed that the temporary reservation amount and the use amount of each of the virtual disks 6 having the coupling device name "disk1" in the three VM guests 20 extracted by the estimation unit 13b are such as given just below:

VM0001-disk1 : temporary reservation amount=1.1 GB, use amount=1 GB
VM0002-disk1 : temporary reservation amount=0 GB, use amount=2 GB
VM0004-disk1 : temporary reservation amount=1.6 GB, use amount=0.5 GB From the expression (1) given hereinabove, the temporary reservation performance amount of a new virtual disk 6 that is a performance target of the temporary reservation is given as:

$$\{(1.1\times 0+1)+(0\times 0+2)+(1.6\times 5/7+0.5)\}/3=$$
$$1.5476\ldots \approx 1.547 \text{ GB (where all numbers after the third place are discarded)}$$

Then, at step S14 of FIG. 11, the temporary reservation unit 13c investigates successive blocks that can be temporarily reserved from the physical disk 40 and performs temporary reservation (steps S17 to S20 of FIG. 12).

In particular, at step S17 of FIG. 12, the temporary reservation unit 13c searches for a region in which non-allocated blocks equal to or greater than the calculated temporary reservation performance amount successively appear from among the blocks of the virtual storage 5, in which the virtual disk 6 is disposed, in order from the top of the physical disk management table 14*d*. If a region including successive blocks greater than the temporary reservation performance amount is not searched out (step S18: No route at step S18), then the temporary reservation unit 13*c* searches for a region having the greatest number of successive non-allocated blocks and determines (changes) the size of the region as (to) a temporarily reservation performance amount (step S19). Thereafter, the processing advances to step S20.

If a region having successive blocks greater than the temporary reservation performance amount is searched out successfully (Yes route at step S18), or if the process at step S19 is performed, then the temporary reservation unit 13*c* performs, in regard to the found region, temporary reservation by a number greater than the temporary reservation performance amount and equal to the minimum number of blocks into the physical disk management table 14*d* (step S20).

It is to be noted that, at step S20, the temporary reservation unit 13*c* changes the field of Allocation state from "non-allocated" to "temporarily reserved" and sets the virtual disk identifier to the field of Allocation destination virtual disk in the physical disk management table 14*d*.

In particular, the temporary reservation unit 13*c* temporarily reserves successive regions (successive blocks) of 1.547 GB of the physical disk 40 into the virtual disk 6 of the coupling device name "disk1" of the new VM guest 20-q (VM guest identifier "VM0006"). For example, where the size of one block is 512 KB, the temporary reservation unit 13*c* searches for a region in which 3094 or more non-allocated blocks successively appear in the physical disk 40 and changes the allocation state for the 3094 blocks in the physical disk management table 14*d* and the virtual disk management table 14*a* to "temporarily reserved" in association with VM0006-disk1.

It is to be noted that, as described above, the storage controlling apparatus 10 performs updating also of the allocation management table 42*a* at the same time with updating of the physical disk management table 14*d* or at a predetermined timing.

As described above, by the estimation unit 13*b* and the temporary reservation unit 13*c*, temporary reservation is performed and the physical disk management table 14*d* and the allocation management table 42*a* are updated (refer to an arrow mark (3) of FIG. 9).

It is to be noted that, if the process at step S20 of FIG. 12 (step S14 of FIG. 11) is completed, then the processing advances to step S15.

Further, after the temporary reservation process ends, the allocation state of the temporarily reserved physical block is updated from "temporarily reserved" to "allocated", for example, at an opportunity of I/O to or from the virtual disk 6 of the VM guest 20-q (refer to an arrow mark (4) of FIG. 9).

[1-5-2] Process upon Use of a Temporary Reservation Block

Now, an example of a process when a temporarily reserved physical block in the storage controlling apparatus 10 is used is described with reference to FIGS. 13 and 14.

First, in the allocation unit 41*a*, writing into a new physical block occurs (step S21). In particular, an access involving allocation of a physical region to a virtual disk 6 occurs. At this time, the allocation unit 41*a* searches the virtual disk 6 to decide whether or not a row of "temporarily reserved" exists in the allocation management table 42*a* (physical disk management table 14*d*).

If a row of "temporarily reserved" exists (step S22: Yes route at step S22), then the allocation state in the top row of "temporarily reserved" in the allocation management table 42*a* (physical disk management table 14*d*) is updated from "temporarily reserved" to "allocated" (step S23).

Then, the allocation unit 41*a* writes actual data relating to the access into a block updated to "allocated" (step S24), and then the processing is ended.

Further, at step S22, if a row of "temporarily reserved" does not exist (No route at step S22), then it is decided by the allocation unit 41*a* whether or not an unused amount of a virtual storage in which the virtual disk 6 exists is zero (or smaller than the threshold value (third threshold value)) (step S25). If the unused amount of the virtual storage is not zero or is equal to or greater than the threshold value (No route at step S25), a block allocation process by an existing thin provisioning method is performed by the allocation unit 41*a* (step S26). In particular, the allocation unit 41*a* searches for a row in which the allocation state is a "non-allocated" state in the allocation management table 42*a* (physical disk management table 14*d*) and changes the allocation state "allocated". Then, the processing advances to step S24.

On the other hand, if the unused amount of the virtual storage is zero or smaller than the threshold value at step S25 (Yes route at step S25), then the cancellation unit 13*d* executes a cancellation process (steps S30 to S33 of FIG. 14) of the temporary reservation (step S27).

At step S30 of FIG. 14, it is decided by the allocation unit 41*a* whether or not the temporary reservation amount of the virtual storage 5 in which the virtual disk 6 exists is zero. If the temporary reservation amount is zero (Yes route at step S30), then since a physical block capable of being utilized does not exit, an error indicating that there is no allocable block (Disk full) is outputted by the allocation unit 41*a* (step S33). Thereafter, the processing is ended. On the other hand, if the temporary reservation amount is not zero at step S30 (No route at step S30), then the cancellation unit 13*d* calculates I/O frequency values of all virtual disks 6 that utilize the physical disk 40 of a writing target and sorts the virtual disks 6 in an ascending order of the I/O frequency value (step S31). Then, the cancellation unit 13*d* updates all rows of "temporarily reserved" in the column of the allocation state in the physical disk management table 14*d* of the virtual disk 6 whose I/O frequency value is lowest to a "non-allocated" state (step S32). Then, the processing advances to step S28 of FIG. 13.

At step S28 of FIG. 13, it is decided by the allocation unit 41*a* whether or not the temporary reservation cancellation process results in success (step S28). Then, if the cancellation process results in success (Yes route at step S28), then the processing advances to step S26. On the other hand, if the cancellation process results in failure (No route at step S28), then since there is no physical block capable of being utilized, an error of (Disk full) indicating that there is no allocable block is outputted form the allocation unit 41*a* (step S29). Then, the processing is ended.

It is to be noted that, while the allocation unit 41*a* performs the processes at steps S21, S23 and S26 based on the allocation management table 42*a*, the present technology is not limited to this. For example, the storage controlling apparatus 10 may be accessed such that the physical disk management table 14*d* is referred to.

As described above, the temporary reservation cancellation process is performed when an access involving allocation of a physical region to the new VM guest 20-q occurs (a block into which data is to be written is required (requested)) and the temporary reservation amount of the certain virtual disk 6 is 0 and besides the unused amount of the virtual storage 5 is zero and the temporary reservation amount of the virtual storage 5 is greater than zero.

As described above, with the storage controlling apparatus 10 according to the present embodiment, the existing VM guest 20a produced from a cloning master image (master information) on which the new VM guest 20b is based is recognized, and the accessing amount to the new virtual disk 6b to be allocated to the new VM guest 20b is estimated based on a result of the monitoring of accessing to the existing virtual disk 6a allocated to the existing VM guest 20a. Then, when the estimated accessing amount exceeds the first threshold value, a plurality of successive blocks (allocation unit regions) of the physical disk 40 are temporarily reserved for the new virtual disk 6b.

Consequently, even if sequential I/O occurs in the storage controlling apparatus 10 that adopts the thin provisioning method, accessing is performed sequentially to the plurality of successive blocks of the physical disk 40. Further, since temporary reservation is performed when the VM guest 20 and the virtual disk 6 are to be newly produced, a special process such as, for example, that in the related art described above does not have to be performed after issuance of an accessing request to the virtual disk 6. Accordingly, degradation of the accessing performance of the virtual disk 6 can be prevented.

Further, the I/O frequency value is calculated regarding the virtual disk 6a of the existing VM guest 20a produced from the cloning master image on which the new virtual disk 6b is based. Accordingly, an accessing amount proximate to that of a tendency of actual accessing to the new virtual disk 6b can be estimated and optimum temporary reservation can be performed.

It is to be noted that, for example, in a technology such as a cloud technology, it is expected that the opportunity of an operation in which a VM guest 20 is produced (deployed) in a scale-out type further increases in the future together with growth of services to be provided. Since, in a service such as a cloud service, in order to perform production of a VM guest 20 easily, an operation in which a new VM guest 20 is deployed is performed based on a cloning master image according to the kind of the VM guest 20 (guest OS). Accordingly, the storage controlling apparatus 10 according to the present embodiment is effective in a service with which the VM guest 20 is operated particularly in a scale out type.

Further, with the storage controlling apparatus 10 according to the present embodiment, the temporary reservation performance amount to be allocated to the new virtual disk 6b is determined by the temporary reservation unit 13c based on the monitoring result of the use amount of the existing VM guest 20a, and a plurality of successive blocks of the new virtual disk 6b are temporarily reserved corresponding to the temporary reservation performance amount. Consequently, since the virtual disk 6 of a performance target of the temporary reservation is temporarily reserved with an optimum temporary reservation performance amount, the region of the physical disk 40 can be utilized efficiently.

[2] Others

Although the preferred embodiment of the present technology has been described in detail, the present technology is not limited to the embodiment specifically described above, and various variations and modifications can be made without departing from the scope of the present invention.

For example, while the embodiment is described above in which an I/O frequency value is calculated from the three VM guests 20, the present technology is not limited to this and an I/O frequency value may be calculated from an arbitrary number of VM guests 20.

Further, the components of the apparatus depicted in FIG. 1 does not have to be necessarily configured physically in such a manner as depicted in FIG. 1. For example, the I/O request acceptance unit 11, I/O execution unit 12, region allocation controlling unit 13 and allocation unit 41a may be integrated in an arbitrary combination.

Further, the allocation unit 41a and the allocation management table 42a may be provided in the storage controlling apparatus 10. In this case, the allocation unit 41a may be integrated with a function of the I/O execution unit 12, and the allocation management table 42a may be integrated with the physical disk management table 14d.

Further, a region into which the DB 14 of the storage controlling apparatus 10 or the allocation management table 42a of the physical storage apparatus 4 is stored may be coupled as an external apparatus through a network.

Further, all or part of the functions of the I/O request acceptance unit 11, I/O execution unit 12, region allocation controlling unit 13 (monitoring unit 13a, estimation unit 13b, temporary reservation unit 13c and cancellation unit 13d) and allocation unit 41a are implemented by a computer (including a CPU, an information processing apparatus and various terminals) executing a predetermined program.

The program is provided in a form in which it is recorded on a computer-readable recording medium such as, for example, a flexible disk, a CD (CD-ROM, CD-R, CD-RW or the like), a DVD (DVD-ROM, DVD-RAM, DVD-R, DVD-RW, DVD+R, DVD+RW or the like) or a Blu-ray disk. In this case, the computer reads out the program from the recording medium and transfers and stores the read out program into an internal storage apparatus or an external storage apparatus and then uses program.

Here, the computer is a concept including hardware and an OS (operating system) and signifies hardware that operates under the control of the OS. Further, in such a case that an OS can be omitted and hardware is operated by an application program by itself, the hardware itself corresponds to the computer. The hardware includes at least a microprocessor such as a CPU and a unit for reading out a computer program recorded on a recording medium. The program described above includes program codes for causing such a computer as described above to implement the various functions of the storage controlling apparatus 10 of the present embodiment. Further, part of the function may be implemented not by an application program but by an OS.

It is to be noted that, in addition to the objects described above, also it shall be understood as one of other objects of the present technology to achieve such effects as are provided by the constitutions of the embodiment of the present technology described hereinabove but are not provided by the prior art.

With the embodiment, degradation of the accessing performance of a virtual disk can be reduced in the storage controlling apparatus that performs allocation of a physical region of a physical disk to a virtual disk.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage controlling apparatus, comprising:
a processor; wherein
the processor:
estimates, when a new virtual machine is to be produced based on first master information, an access frequency to a new virtual disk to be allocated to the new virtual machine based on an access frequency to an existing virtual disk allocated to an existing virtual machine produced from the first master information, the first master information being one of a plurality of master information, the plurality of master information differing from each other in regard to one of (a) to (d): (a) a function of a virtual machine produced from each master information; (b) a role of a virtual machine produced from each master information; (c) a user of a virtual machine produced from each master information; or (d) any combination of (a) to (c), the existing virtual machine and the new virtual machine being same in the one of (a) to (d); and
temporarily reserves, when the access frequency which is estimated exceeds a first threshold value, a plurality of successive allocation unit regions in a physical disk by associating the plurality of successive allocation unit regions and the new virtual disk each other, wherein
when an access that involves allocation of a physical region to the new virtual disk occurs, an access region of the new virtual disk is allocated to at least part of the plurality of temporarily reserved successive allocation unit regions.

2. The storage controlling apparatus according to claim 1, wherein the processor determines a temporary reservation performance amount to be allocated to the new virtual disk based on a use amount of the existing virtual disk and temporarily reserves the plurality of successive allocation unit regions corresponding to the temporary reservation performance amount to the new virtual disk.

3. The storage controlling apparatus according to claim 1, wherein, when an unused amount of a virtual storage to which the new virtual disk belongs is smaller than a second threshold value, the processor stops a temporary reservation of the plurality of successive allocation unit regions to the new virtual disk.

4. The storage controlling apparatus according to claim 3, wherein, when the unused amount of the virtual storage is smaller than a third threshold value, if an access that involves allocation of a physical region to a virtual disk that belongs to the virtual storage occurs, the processor cancels at least part of the plurality of allocation unit regions temporarily reserved for a virtual disk whose access frequency to the existing virtual disk is low from among virtual disks that belong to the virtual storage.

5. The storage controlling apparatus according to claim 4, wherein the processor
allocates, when the unused amount of the virtual storage is smaller than the third threshold value, the access region of a virtual disk that belongs to the virtual storage and to which the access occurs to at least part of the plurality of allocation unit regions which are cancelled.

6. The storage controlling apparatus according to claim 1, further comprising:
a memory that retains, for each virtual disk, a virtual disk management table that stores an access frequency to the existing virtual disk; wherein
the access frequency to the existing virtual disk includes a number of times of accessing and an average data transfer amount for each predetermined period.

7. The storage controlling apparatus according to claim 6, wherein the processor executes an access to the existing virtual disk by the existing virtual machine and outputs an access history; and
in the memory, the access frequency to the existing virtual disk based on the access history is stored into the virtual disk management table.

8. An information processing apparatus, comprising:
a server apparatus that executes a virtual machine;
a physical storage apparatus including at least one physical disk;
a storage controlling apparatus that performs control of the server apparatus and the physical storage apparatus; and
a processor; wherein
the processor:
estimates, when a new virtual machine is to be produced based on first master information, an access frequency to a new virtual disk to be allocated to the new virtual machine based on an access frequency to an existing virtual disk allocated to an existing virtual machine produced from the first master information, the first master information being one of a plurality of master information, the plurality of master information differing from each other in regard to one of (a) to (d): (a) a function of a virtual machine produced from each master information; (b) a role of a virtual machine produced from each master information; (c) a user of a virtual machine produced from each master information; or (d) any combination of (a) to (c), the existing virtual machine and the new virtual machine being same in the one of (a) to (d);
temporarily reserves, when the access frequency which is estimated exceeds a first threshold value, a plurality of successive allocation unit regions in a physical disk by associating the plurality of successive allocation unit regions and the new virtual disk each other; and
allocates, when an access that involves allocation of a physical region to the new virtual disk occurs, an access region of the new virtual disk to at least part of the plurality of temporarily reserved successive allocation unit regions.

9. The information processing apparatus according to claim 8, wherein the processor determines a temporary reservation performance amount to be allocated to the new virtual disk based on a use amount of the existing virtual disk and temporarily reserves the plurality of successive allocation unit regions corresponding to the temporary reservation performance amount to the new virtual disk.

10. The information processing apparatus according to claim 8, wherein, when an unused amount of a virtual storage to which the new virtual disk belongs is smaller than a second threshold value, the processor stops a temporary reservation of the plurality of successive allocation unit regions to the new virtual disk.

11. The information processing apparatus according to claim 10, wherein, when the unused amount of the virtual storage is smaller than a third threshold value, if an access that involves allocation of a physical region to a virtual disk that belongs to the virtual storage occurs, the processor cancels at least part of the plurality of allocation unit regions temporarily reserved for a virtual disk whose access frequency to the existing virtual disk is low from among virtual disks that belong to the virtual storage.

12. The information processing apparatus according to claim 11, wherein the processor allocates the access region of a virtual disk that belongs to the virtual storage and to which the access occurs to at least part of the plurality of allocation unit regions which are cancelled.

13. The information processing apparatus according to claim 8, further comprising:
   a memory that retains, for each virtual disk, a virtual disk management table that stores an access frequency to the existing virtual disk; wherein
   the access frequency to the existing virtual disk includes a number of times of accessing and an average data transfer amount for each predetermined period.

14. The information processing apparatus according to claim 13, wherein the processor executes an access to the existing virtual disk by the existing virtual machine and outputs an access history; and
   in the memory, the access frequency to the existing virtual disk based on the access history is stored into the virtual disk management table.

15. A non-transitory computer-readable recording medium having stored therein a storage control program for causing a computer to execute a process for managing a virtual disk allocated to a virtual machine and for managing a physical region of a physical disk, the process comprising:
   estimating, when a new virtual machine is to be produced based on first master information, an access frequency to a new virtual disk to be allocated to the new virtual machine based on an access frequency to an existing virtual disk allocated to an existing virtual machine produced from the first master information, the first master information being one of a plurality of master information, the plurality of master information differing from each other in regard to one of (a) to (d): (a) a function of a virtual machine produced from each master information; (b) a role of a virtual machine produced from each master information; (c) a user of a virtual machine produced from each master information; or (d) any combination of (a) to (c), the existing virtual machine and the new virtual machine being same in the one of (a) to (d); and
   temporarily reserving, when the access frequency which is estimated exceeds a first threshold value, a plurality of successive allocation unit regions in a physical disk by associating the plurality of successive allocation unit regions and the new virtual disk each other, wherein
   when an access that involves allocation of a physical region to the new virtual disk occurs, an access region of the new virtual disk is allocated to at least part of the plurality of temporarily reserved successive allocation unit regions.

16. The non-transitory computer-readable recording medium according to claim 15, wherein the process further comprises: in a temporary reservation, determining a temporary reservation performance amount to be allocated to the new virtual disk based on a use amount of the existing virtual disk and temporarily reserving the plurality of successive allocation unit regions corresponding to the temporary reservation performance amount to the new virtual disk.

17. The non-transitory computer-readable recording medium according to claim 15, wherein the process further comprises: in a temporary reservation, stopping, when an unused amount of a virtual storage to which the new virtual disk belongs is smaller than a second threshold value, a temporary reservation of the plurality of successive allocation unit regions to the new virtual disk.

18. The non-transitory computer-readable recording medium according to claim 17, wherein the process further comprises:
   cancelling, when the unused amount of the virtual storage is smaller than a third threshold value, if an access that involves allocation of a physical region to a virtual disk that belongs to the virtual storage occurs, at least part of the plurality of allocation unit regions temporarily reserved for a virtual disk whose access frequency to the existing virtual disk is low from among virtual disks that belong to the virtual storage.

* * * * *